(12) United States Patent
Sakamoto et al.

(10) Patent No.: US 8,791,210 B2
(45) Date of Patent: Jul. 29, 2014

(54) POLYACRYLIC WATER-ABSORBENT RESIN POWDER AND METHOD FOR PRODUCING THE SAME

(75) Inventors: Shigeru Sakamoto, Himeji (JP); Yoshio Irie, Himeji (JP); Kozo Nogi, Himeji (JP); Kunihiko Ishizaki, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 202 days.

(21) Appl. No.: 13/201,701

(22) PCT Filed: Feb. 17, 2010

(86) PCT No.: PCT/JP2010/001004
§ 371 (c)(1),
(2), (4) Date: Aug. 16, 2011

(87) PCT Pub. No.: WO2010/095427
PCT Pub. Date: Aug. 26, 2010

(65) Prior Publication Data
US 2011/0313113 A1    Dec. 22, 2011

(30) Foreign Application Priority Data

Feb. 17, 2009  (JP) .................................. 2009-033863
Dec. 24, 2009  (JP) .................................. 2009-292318

(51) Int. Cl.
| | | |
|---|---|---|
| C08C 19/00 | (2006.01) | |
| C08F 20/10 | (2006.01) | |
| C08F 222/20 | (2006.01) | |
| C08F 2/34 | (2006.01) | |
| C08F 8/00 | (2006.01) | |

(52) U.S. Cl.
CPC ................ C08C 19/00 (2013.01); C08F 20/10 (2013.01); C08F 222/20 (2013.01); C08F 2/34 (2013.01); C08F 8/00 (2013.01)
USPC ....................... 525/384; 526/318.41

(58) Field of Classification Search
CPC ............ C08F 2/10; C08F 220/06; C08F 2/16; C08F 222/20; C08F 2/34; C08F 2/04; C08F 8/00; C08C 19/00
USPC ....................... 526/318.41; 525/384
See application file for complete search history.

(56) References Cited

U.S. PATENT DOCUMENTS

| | | | |
|---|---|---|---|
| 4,656,232 A | 4/1987 | Nakai et al. | |
| 4,703,067 A | 10/1987 | Mikita et al. | |
| 4,857,610 A | 8/1989 | Chmelir et al. | |
| 4,893,999 A | 1/1990 | Chmelir et al. | |
| 4,954,562 A | 9/1990 | Anderson et al. | |
| 4,985,518 A | 1/1991 | Alexander et al. | |
| 5,002,986 A | 3/1991 | Fujiura et al. | |
| 5,118,719 A | 6/1992 | Lind | |
| 5,124,188 A | 6/1992 | Roe et al. | |
| 5,145,906 A | 9/1992 | Chambers et al. | |
| 5,154,713 A | 10/1992 | Lind | |
| 5,314,420 A | 5/1994 | Smith et al. | |
| 5,338,766 A | 8/1994 | Phan et al. | |
| 5,380,808 A | 1/1995 | Sumiya et al. | |
| 5,399,591 A | 3/1995 | Smith et al. | |
| 5,451,452 A | 9/1995 | Phan et al. | |
| 5,451,613 A | 9/1995 | Smith et al. | |
| 5,462,972 A | 10/1995 | Smith et al. | |
| 5,562,646 A | 10/1996 | Goldman et al. | |
| 5,624,967 A | 4/1997 | Hitomi et al. | |
| 5,712,316 A | 1/1998 | Dahmen et al. | |
| 5,837,789 A | 11/1998 | Stockhausen et al. | |
| 5,856,370 A | 1/1999 | Chmelir | |
| 5,985,944 A | 11/1999 | Ishizaki et al. | |
| 6,071,976 A | 6/2000 | Dairoku et al. | |
| 6,107,358 A | 8/2000 | Harada et al. | |
| 6,136,873 A | 10/2000 | Hahnle et al. | |
| 6,174,929 B1 | 1/2001 | Hahnle et al. | |
| 6,359,049 B1 | 3/2002 | Carrico et al. | |
| 6,414,214 B1 | 7/2002 | Engelhardt et al. | |
| 6,562,879 B1 | 5/2003 | Hatsuda et al. | |

(Continued)

FOREIGN PATENT DOCUMENTS

| | | |
|---|---|---|
| EP | 0450922 | 10/1991 |
| EP | 0595803 | 10/1991 |

(Continued)

OTHER PUBLICATIONS

International Search Report for PCT/JP2010/001004 dated Jun. 1, 2010.
Buchholz, F. et al., Modern Superabsorbent Polymer Technology, WILEY-VCR, 1998, especially pp. 39-44 & pp. 197-199.
International Search Report for PCT/JP2010/073254, dated Mar. 29, 2011.
Supplementary European Search Report for 10839528.6, dated Apr. 24, 2013.
Supplementary European Search Report for 10743557.0, dated Mar. 22, 2013.

*Primary Examiner* — Michael M Bernshteyn
(74) *Attorney, Agent, or Firm* — Roylance, Abrams, Berdo & Goodman, L.L.P.

(57) ABSTRACT

A method for producing a polyacrylic water-absorbent resin powder includes the steps of: producing an acrylic monomer solution in which gas is dissolved and/or dispersed; polymerizing the monomer solution in the absence of a surface active agent or in the presence of not more than 300 ppm of a surface active agent; during or after polymerizing, fragmenting the resulting hydrated gel crosslinked polymer; and drying the fragmented hydrated gel crosslinked polymer, the gas being dissolved and/or dispersed in the monomer solution by (a) applying pressure to the acrylic monomer solution and the gas; (b) creating swirling flows of the acrylic monomer solution and the gas; or (c) introducing the gas with the acrylic monomer solution via fine holes. The production method efficiently produces a water-absorbent resin having an excellent water-absorption rate without deteriorating a liquid-absorbent property of a sanitary product or the like.

5 Claims, 5 Drawing Sheets

(56) References Cited

U.S. PATENT DOCUMENTS

| | | |
|---|---|---|
| 6,710,141 B1 | 3/2004 | Heide et al. |
| 6,750,262 B1 | 6/2004 | Hahnle et al. |
| 6,939,914 B2 | 9/2005 | Qin et al. |
| 7,091,253 B2 | 8/2006 | Dairoku et al. |
| 7,169,843 B2 | 1/2007 | Smith et al. |
| 7,173,086 B2 | 2/2007 | Smith et al. |
| 7,265,190 B2 | 9/2007 | Dairoku et al. |
| 7,473,739 B2 * | 1/2009 | Dairoku et al. ............ 525/327.6 |
| 7,582,705 B2 * | 9/2009 | Dairoku et al. ................ 525/379 |
| 2005/0176834 A1 | 8/2005 | Hintz et al. |
| 2005/0209352 A1* | 9/2005 | Dairoku et al. ................ 521/50 |
| 2005/0256469 A1 | 11/2005 | Qin et al. |
| 2006/0036043 A1 | 2/2006 | Nestler et al. |
| 2007/0015860 A1 | 1/2007 | Frank |
| 2007/0088093 A1 | 4/2007 | Joy et al. |
| 2007/0197749 A1 | 8/2007 | Matsuda et al. |
| 2007/0225422 A1 | 9/2007 | Sakamoto et al. |
| 2008/0227933 A1 | 9/2008 | Funk et al. |
| 2008/0269372 A1* | 10/2008 | Dairoku et al. ............... 523/149 |
| 2010/0234531 A1 | 9/2010 | Frank |
| 2010/0240808 A1 | 9/2010 | Wada et al. |
| 2010/0268181 A1 | 10/2010 | Ziemer et al. |

FOREIGN PATENT DOCUMENTS

| | | |
|---|---|---|
| EP | 0496067 | 7/1992 |
| EP | 0827753 | 3/1998 |
| EP | 1521601 | 4/2005 |
| EP | 1837348 | 9/2007 |
| EP | 1957188 | 2/2010 |
| JP | 57-034101 | 2/1982 |
| JP | 62-156102 | 7/1987 |
| JP | 1-126310 | 5/1989 |
| JP | 01-318021 | 12/1989 |
| JP | 3-115313 | 5/1991 |
| JP | 3-174414 | 7/1991 |
| JP | 4-175319 | 6/1992 |
| JP | 4-236203 | 8/1992 |
| JP | 5-237378 | 9/1993 |
| JP | 9-124879 | 5/1997 |
| JP | 10-57805 | 3/1998 |
| JP | 10-114801 | 5/1998 |
| JP | 10-168129 | 6/1998 |
| JP | 10-251310 | 9/1998 |
| JP | 2000-506911 | 6/2000 |
| JP | 2005-162834 | 6/2005 |
| JP | 2007-284675 | 11/2007 |
| JP | 2008-24943 | 2/2008 |
| WO | 91/015368 | 10/1991 |
| WO | 92/018171 | 10/1992 |
| WO | 94/22502 | 10/1994 |
| WO | 95/02002 | 1/1995 |
| WO | 97/17397 | 5/1997 |
| WO | 97/19116 | 5/1997 |
| WO | 00/52087 | 9/2000 |
| WO | 2004/052949 | 6/2004 |
| WO | 2005/007713 | 1/2005 |
| WO | 2005/012406 | 2/2005 |
| WO | 2005/063313 | 7/2005 |
| WO | 2006/008905 | 1/2006 |
| WO | 2007/025921 | 3/2007 |
| WO | 2009/048145 | 4/2009 |
| WO | 2009/062902 | 5/2009 |

* cited by examiner

F I G. 5
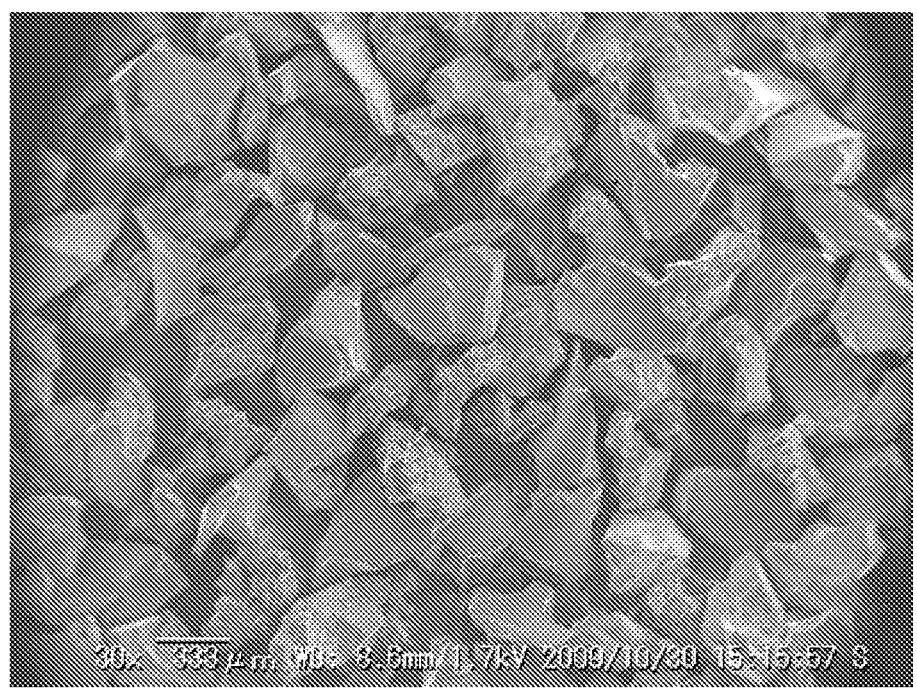

POLYACRYLIC WATER-ABSORBENT RESIN POWDER AND METHOD FOR PRODUCING THE SAME

TECHNICAL FIELD

The present invention relates to polyacrylic water-absorbent resin powder and a method for producing the same. Specifically, the present invention relates to: water-absorbent resin powder which is employed for, for example, sanitary products such as a disposable diaper and a sanitary napkin and which has an excellent water-absorbent property (particularly, an excellent water-absorption rate); and a method for producing the water-absorbent resin powder.

BACKGROUND ART

A water-absorbent resin is broadly employed for sanitary products such as a disposable diaper, a sanitary napkin and an incontinence pad for adults, a soil water retention agent and the like. Such a water-absorbent resin is produced and consumed in large quantities. Examples of the water-absorbent resin encompass a partially neutralized and crosslinked polyacrylic acid, a hydrolyzed starch/acrylic graft polymer, a saponified vinyl acetate/acrylic ester copolymer, a hydrolyzed acrylonitrile copolymer or a hydrolyzed acrylamide copolymer, a crosslinked acrylonitrile copolymer or a crosslinked acrylamide copolymer, and a crosslinked cationic monomer. The above-described water-absorbent resin is produced by a method of polymerizing, under stirring, an aqueous solution including a hydrophilic monomer, the stirring crushing a polymerized gel (see Patent Literature 1), a method of statically polymerizing an aqueous solution including a monomer (see Patent Literatures 2 to 6) or like method.

Recently, a sanitary product having a reduced thickness as a result of reduction in quantity of cotton-like pulp included in the sanitary product has been commercialized. In order to produce such a sanitary product, a water-absorbent resin to be used has increased in quantity, and there has been requirement for an excellent physical property of the water-absorbent resin. Specifically, there has been requirement for an excellent water-absorption rate of the water-absorbent resin. Water-absorbent resin manufacturers have proposed various techniques (see Patent Literatures 7 to 10).

Examples of such techniques encompass a method of using a great deal of a surface active agent so as not to eliminate, prior to polymerization, bubbles suspended in a monomer solution (see Patent Literature 8), and a method of keeping a monomer solution at a low temperature (see Patent Literatures 7, 9 and 10).

However, in a case where a water-absorbent resin produced by the method of using a great deal of a surface active agent is employed for a sanitary product, the water-absorbent resin possibly causes deterioration in interfacial (surface) tension of body fluid. This interferes with a liquid-absorbent property of the sanitary product. Meanwhile, the method of keeping the monomer solution at a low temperature possibly needs long time period for polymerization. This results in poor productivity.

Examples of a foaming agent to be employed for a monomer in the above-described foam polymerization encompass carbonate (Patent Literatures 11 to 18), an organic solvent (Patent Literatures 19 and 20), inert gas (Patent Literatures 21 to 23), an azo compound (Patent Literatures 24 and 25), and insoluble inorganic powder (Patent Literature 26). Further, a technique of foaming and crosslinking after the polymerization (see Patent Literature 27) is also proposed. Furthermore, a technique of employing water-insoluble particles for polymerization (see Patent Literature 28) is also proposed.

The above-described techniques improve the water-absorption rate to some extent. However, these techniques cause, for example, deterioration in liquid permeability or impact resistance (Patent Literatures 29, and 32 to 34), or bulk specific gravity (Patent Literatures 30 and 31) of the water-absorbent resin though these properties have recently been required, or cause generation of fine powder or dust during producing (particularly, crushing) or using the water-absorbent resin. That is, these techniques are not sufficiently efficient.

CITATION LIST

Patent Literatures

Patent Literature 1
Japanese Patent Application Publication, Tokukaisho No. 57-034101 A
Patent Literature 2
Japanese Patent Application Publication, Tokukaisho No. 62-156102 A
Patent Literature 3
Japanese Patent Application Publication, Tokukaihei No. 01-126310 A
Patent Literature 4
Japanese Patent Application Publication, Tokukaihei No. 03-174414 A
Patent Literature 5
Japanese Patent Application Publication, Tokukaihei No. 04-175319 A
Patent Literature 6
Japanese Patent Application Publication, Tokukaihei No. 04-236203 A
Patent Literature 7
Japanese Patent Application Publication, Tokukaihei No. 05-237378 A
Patent Literature 8
Japanese Patent Application Publication, Tokukai No. 2008-024943 A
Patent Literature 9
Japanese Patent Application Publication, Tokukaihei No. 10-251310 A
Patent Literature 10
Japanese Patent Application Publication, Tokukaihei No. 10-114801 A
Patent Literature 11
U.S. Pat. No. 5,118,719, specification
Patent Literature 12
U.S. Pat. No. 5,154,713, specification
Patent Literature 13
U.S. Pat. No. 5,314,420, specification
Patent Literature 14
U.S. Pat. No. 5,399,591, specification
Patent Literature 15
U.S. Pat. No. 5,451,613, specification
Patent Literature 16
U.S. Pat. No. 5,462,972, specification
Patent Literature 17
International Patent Application Publication No. WO95/02002, pamphlet Patent Literature 18
International Patent Application Publication No. WO2005/063313, pamphlet
Patent Literature 19
International Patent Application Publication No. WO94/022502, pamphlet
Patent Literature 20
U.S. Pat. No. 4,703,067, specification
Patent Literature 21
International Patent Application Publication No. WO97/017397, pamphlet
Patent Literature 22
International Patent Application Publication No. WO00/052087, pamphlet
Patent Literature 23
U.S. Pat. No. 6,107,358, specification
Patent Literature 24
U.S. Pat. No. 5,856,370, specification
Patent Literature 25
U.S. Pat. No. 5,985,944, specification
Patent Literature 26
International Patent Application Publication No. WO2009/062902, pamphlet
Patent Literature 27
European Patent No. 1521601, specification
Patent Literature 28
United States Patent Application Publication No. 2007/0225422, specification
Patent Literature 29
U.S. Pat. No. 6,414,214, specification
Patent Literature 30
U.S. Pat. No. 6,562,879, specification
Patent Literature 31
U.S. Pat. No. 7,473,739, specification
Patent Literature 32
U.S. Pat. No. 6,071,976, specification
Patent Literature 33
International Patent Application Publication No. WO97/019116, pamphlet
Patent Literature 34
Japanese Patent Application Publication, Tokukaihei No. 09-124879 A

SUMMARY OF INVENTION

Technical Problem

Methods described in the Patent Literatures are applied to improving a water-absorption rate of a water-absorbent resin. However, the water-absorption rate is not sufficiently improved by the above-described methods. Further, it is required to stably and efficiently produce the water-absorbent resin. Furthermore, a water-absorbent resin produced by foam polymerization is poor in bulk specific gravity, and liquid permeability or impact resistance that is required for Patent Literatures 29 to 34 and the like.

An object of the present invention is to provide a method for efficiently producing a water-absorbent resin excellent in water-absorbent rate, which water-absorbent resin neither inhibits a liquid-absorbent property of a sanitary product or the like nor causes excessive deterioration in bulk specific gravity.

Solution to Problem

For attaining the object of the present invention, the inventors of the present invention noticed importance of a method for dispersing or dissolving bubbles in a monomer during the polymerization. Then, the inventors of the present invention found that the object of the present invention can be attained by employing a specific method, thereby achieving that water-absorbent resin powder which does not cause deterioration in bulk specific gravity and surface tension and which has excellent liquid permeability and impact resistance is produced. In this way, the present invention was completed.

In order to attain the object, a water-absorbent resin powder production method (first production method) of the present invention is a polyacrylic water-absorbent resin powder production method including the steps of: producing an acrylic monomer solution in which gas is dissolved and/or dispersed; polymerizing the acrylic monomer solution in the absence of a surface active agent or in the presence of not more than 300 ppm of a surface active agent; during or after the step of polymerizing, fragmenting a hydrated gel crosslinked polymer obtained by polymerizing the acrylic monomer solution; and drying by heat the hydrated gel crosslinked polymer thus fragmented, the gas being dissolved and/or dispersed in the acrylic monomer solution by at least one of the methods (a) to (c): (a) applying pressure to the acrylic monomer solution and the gas; (b) creating swirling flows of the acrylic monomer solution and the gas; and (c) introducing the gas with the acrylic monomer solution via fine holes.

Further, in order to attain the object, a water-absorbent resin powder production method (second production method) of the present invention is a polyacrylic water-absorbent resin powder production method including the steps of: producing an acrylic monomer solution in which gas is dissolved and/or dispersed; defoaming to eliminate some of bubbles included in the acrylic monomer solution; polymerizing the acrylic monomer solution including the bubbles in the absence of a surface active agent or in the presence of not more than 300 ppm of a surface active agent; during or after the step of polymerizing, fragmenting a hydrated gel crosslinked polymer obtained by polymerizing the acrylic monomer solution; and drying by heat the hydrated gel crosslinked polymer thus fragmented, the step of polymerizing the acrylic monomer solution including the bubbles being carried out after the step of defoaming.

Further, a water-absorbent resin powder production method (third production method) of the present invention is a polyacrylic water-absorbent resin powder production method including the steps of: producing an acrylic monomer solution in which gas is dissolved and/or dispersed; deforming to eliminate some of bubbles included in the acrylic monomer solution; polymerizing the acrylic monomer solution including the bubbles in the absence of a surface active agent or in the presence of not more than 300 ppm of a surface active agent; during or after the step of polymerizing, fragmenting a hydrated gel crosslinked polymer obtained by polymerizing the acrylic monomer solution; and drying by heat the hydrated gel crosslinked polymer thus fragmented, the acrylic monomer solution and inert gas being mixed with each other at a stirring Reynolds number of not less than 10000.

Further, a water-absorbent resin powder production method (fourth production method) of the present invention is a polyacrylic water-absorbent resin powder production method wherein an acrylic monomer is polymerized by mixing an acrylic monomer solution with inert gas at a stirring Reynolds number of not less than 10000 in the absence of a surface active agent or in the presence of not more than 0.003% by weight of a surface active agent to the acrylic monomer such that fine bubbles of the inert gas are suspended in the acrylic monomer solution.

Further, a water-absorbent resin powder production method (fifth production method) of the present invention is a polyacrylic water-absorbent resin powder production method including the steps of: producing an acrylic monomer solution in which gas is dissolved and/or dispersed; polymerizing the acrylic monomer solution including bubbles in the absence of a surface active agent or in the presence of not more than 300 ppm of a surface active agent; during or after the step of polymerizing, fragmenting a hydrated gel crosslinked polymer obtained by polymerizing the acrylic monomer solution; and drying by heat the hydrated gel crosslinked polymer thus fragmented, the acrylic monomer solution having a kaolin turbidity of more than 0 but not more than 1000 [mg/L (degree)].

Further, a water-absorbent resin powder production method (sixth production method) of the present invention is a polyacrylic water-absorbent resin powder production method wherein an acrylic monomer is polymerized by mixing an acrylic monomer solution with inert gas by use of a micro bubble generator in the absence of a surface active agent or in the presence of not more than 0.003% by weight of a surface active agent to the acrylic monomer such that bubbles of the inert gas are suspended in the acrylic monomer solution.

Water-absorbent resin powder of the present invention is polyacrylic water-absorbent resin powder having a water-absorbency index of not less than 90 and a bulk specific gravity of 0.6 [g/cm$^3$] to 0.8 [g/cm$^3$], the water-absorbency index being calculated by the following formula:

(Water-absorbency index)=(FSR [g/g/sec])×(bulk specific gravity [g/cm$^3$])×(weight average particle diameter [μm]).

A water-absorbent resin powder production method of the present invention is a polyacrylic water-absorbent resin powder production method including the step of surface-crosslinking polyacrylic water-absorbent resin powder having a water-absorbency index of not less than 90 and a bulk specific gravity of 0.6 [g/cm$^3$] to 0.8 [g/cm$^3$], the water-absorbency index being calculated by the following formula:

(Water-absorbency index)=(FSR [g/g/sec])×(bulk specific gravity [g/cm$^3$])×(weight average particle diameter [μm]).

Advantageous Effects of Invention

A method for producing water-absorbent resin powder of the present invention makes it possible to productively and efficiently produce water-absorbent resin powder having an excellent water-absorption rate without employing a great deal of a surface active agent. The method for producing the water-absorbent resin powder of the present invention also makes it possible to provide a water-absorbent resin having an excellent stability in powder form and a water-absorbency index of not less than 90.

BRIEF DESCRIPTION OF DRAWINGS

FIG. 5 is an SEM (scanning electron microscope) photograph of comparative water-absorbent resin powder produced in Comparative Example 2.

DESCRIPTION OF EMBODIMENTS

Figure 1:
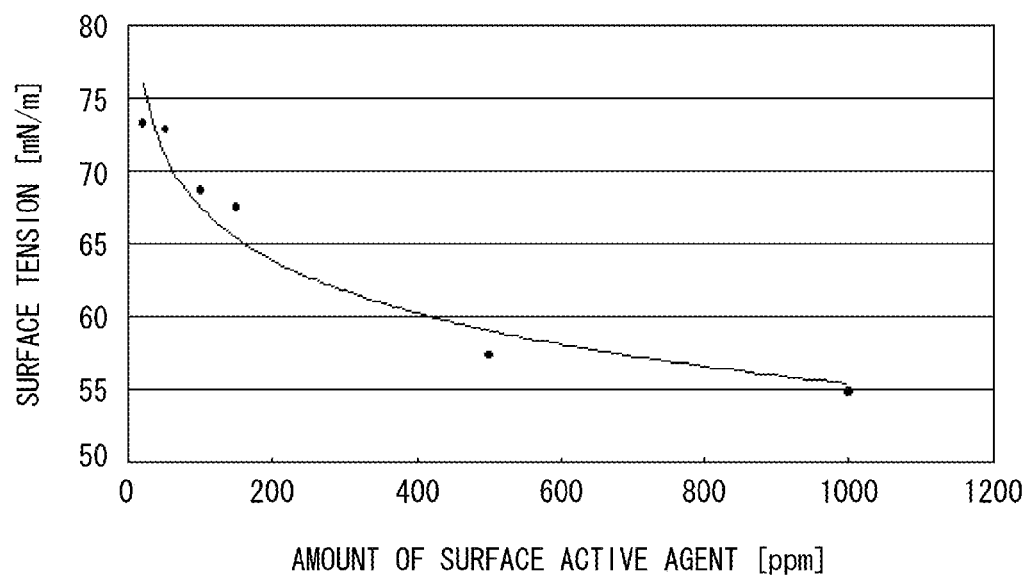
FIG. 1 is a graph plotting a relationship of surface tension with an amount of surface active agent to be used.

The following describes in detail polyacrylic water-absorbent resin powder of the present invention and a method for producing the same. However, the present invention is not limited to the description of the following embodiments, but may be applied in many variations within the spirit of the present invention, provided such variations do not exceed the scope of the patent claims set forth below. Specifically, the present invention is not limited to the description of the following embodiments, but may be altered by a skilled person within the scope of the claims. An embodiment based on a proper combination of technical means disclosed in different embodiments is encompassed in the technical scope of the present invention.

(1) DEFINITION OF TERMS (1-1) "Water-Absorbent Resin Powder"

What is meant by "water-absorbent resin powder" of the present invention is a water-swellable and water-insoluble polymer gel agent. What is meant by "water-swellable" is that CRC (water-absorption ratio under no pressure) defined by ERT441.2-02 is not less than 5 [g/g]. What is meant by "water-insoluble" is that Ext (water-soluble content) defined by ERT470.2-02 is in the range of 0 to 50% by weight.

The water-absorbent resin powder can be designed as appropriate in accordance with how to use the water-absorbent resin powder, and is not particularly limited. Meanwhile, it is preferable that the water-absorbent resin powder is a hydrophilic crosslinked polymer obtained by crosslinkingly polymerizing an unsaturated monomer having a carboxyl group. Further, it is not limited that the water-absorbent resin powder consists of polymers only (100% by weight), alternatively may include an additive or the like as long as the water-absorbent resin powder retains the property.

(1-2) "Polyacrylic Water-Absorbent Resin Powder"

What is meant by "polyacrylic water-absorbent resin powder" of the present invention is water-absorbent resin powder mainly containing an acrylic acid and/or a salt thereof (hereinafter referred to as an acrylic acid (acrylate)), as a repetition unit(s).

Specifically, what is meant by the polyacrylic water-absorbent resin powder is a polymer containing 50 mol % to 100 mol % of acrylic acid (acrylate) among all monomers (excluding a crosslinking agent) to be employed for the polymerization, preferably water-absorbent resin powder containing 70 mol % to 100 mol % of the acrylic acid (acrylate), more preferably water-absorbent resin powder containing 90 mol % to 100 mol % of the acrylic acid (acrylate), most preferably water-absorbent resin powder containing substantially 100 mol % of the acrylic acid (acrylate).

(1-3) "EDANA" and "ERT"

"EDANA" stands for European Disposables and Nonwovens Associations, and "ERT" stands for a water-absorbent resin measurement method (EDANA Recommended Test Methods) that meets European standards (substantially regarded as global standards).

A physical property of the water-absorbent resin powder of the present invention is measured in accordance with the ERT original (conventional document modified in 2002) as long as it is not otherwise specified.

(a) "CRC" (ERT441.2-02)

"CRC" stands for Centrifuge Retention Capacity. What is meant by CRC is a water-absorption ratio under no pressure (hereinafter possibly referred to as "water-absorption ratio"). Specifically, what is meant by CRC is a water-absorption ratio (unit: [g/g]) obtained by freely swelling in 0.9% by weight of sodium chloride solution for 30 minutes and then centrifuging by use of a centrifuge.

(b) "AAP" (ERT442.2-02)

"AAP" stands for Absorption Against Pressure. What is meant by AAP is a water-absorption ratio under pressure. Specifically, what is meant by APP is a water-absorption ratio (unit: [g/g]) obtained by swelling in 0.9% by weight of sodium chloride solution under pressure of 2.06 kPa for 1 hour.

Note that AAP is substantially identical with the property described as "Absorption Under Pressure" in ERT442.2-02.

(c) "Ext" (ERT470.2-02)

"Ext" stands for Extractables. What is meant by Ext is a water-soluble content (water-soluble content). Specifically, what is meant by Ext is a value (unit: % by weight) obtained by stirring 1 g of water-absorbent resin powder in 200 g of 0.9% by weight of sodium chloride solution for 16 hours and then measuring by pH titration how much polymer is dissolved therein.

(d) "PSD" (ERT420.2-02)

"PSD" stands for Particle Size Distribution. What is meant by PSD is particle size distribution measured by sieving. Weight average particle diameter (D50) and particle diameter distribution are measured by a method identical to a method by which "(1) Average Particle Diameter and Distribution of Particle Diameter" described in page 7 lines 25 to 43 of the specification of European Patent Publication No. 0349240 is measured.

(1-4) "Liquid Permeability"

What is meant by "liquid permeability" is flow of liquid that flows between particles of water-absorbent resin powder swelled under pressure or under no pressure. The "liquid permeability" is measured by measuring, typically, SFC (Saline Flow Conductivity) or GBP (Gel Bed Permeability).

What is meant by "SFC (Saline Flow Conductivity)" is liquid permeability of 0.69% by weight of saline for water-absorbent resin powder under pressure of 2.07 kPa. SFC is measured by SFC testing method described in the specification of U.S. Pat. No. 5,669,894.

What is meant by "GBP" is liquid permeability of 0.69% by weight of saline for water-absorbent resin powder under pressure or in free expansion. GBP is measured by GBP testing method described in the pamphlet of International Patent Application Publication No. WO2005/016393.

(1-5) Others

What is meant by "X to Y" indicating a scope in the present specification is "not less than X but not more than Y". Further, what is meant by "t (ton)" that is a unit of weight is "Metric ton". Further, what is meant by "ppm" is "ppm by weight" if not otherwise specified. Furthermore, what is meant by "(meth)acryl" that is employed for (meth)acrylic acid or the like is acryl or methacryl. Moreover, what is meant by a room temperature is 25° C., and what is meant by a normal pressure is 1 atmosphere if not otherwise specified.

[2] METHOD FOR PRODUCING POLYACRYLIC WATER-ABSORBENT RESIN POWDER

The polyacrylic water-absorbent resin powder of the present invention is produced by, for example, any one of the following methods (I) to (IV). The following methods are suitably applicable to continuous production.

Method (I): A polyacrylic water-absorbent resin powder production method including the steps of:

producing an acrylic monomer solution in which gas is dissolved and/or dispersed (dissolving and/or dispersing step);

polymerizing the acrylic monomer solution in the absence of a surface active agent or in the presence of not more than 300 ppm of a surface active agent (polymerization step);

during or after the step of polymerizing, fragmenting a hydrated gel crosslinked polymer obtained by polymerizing the acrylic monomer solution (fragmenting step); and drying by heat the hydrated gel crosslinked polymer thus fragmented (thermally drying step), the gas being dissolved and/or dispersed in the acrylic monomer solution by at least one of the methods (a) to (c):

(a) applying pressure to the acrylic monomer solution and the gas;

(b) creating swirling flows of the acrylic monomer solution and the gas; and (c) introducing the gas with the acrylic monomer solution via fine holes.

Method (II): A polyacrylic water-absorbent resin powder production method including the steps of:

producing an acrylic monomer solution in which gas is dissolved and/or dispersed (dissolving and/or dispersing step);

defoaming to eliminate some of bubbles included in the acrylic monomer solution (defoaming step);

polymerizing the acrylic monomer solution including the bubbles in the absence of a surface active agent or in the presence of not more than 300 ppm of a surface active agent (polymerization step);

during or after the step of polymerizing, fragmenting a hydrated gel crosslinked polymer obtained by polymerizing the acrylic monomer solution (fragmenting step); and drying by heat the hydrated gel crosslinked polymer thus fragmented (thermally drying step), the step of polymerizing the acrylic monomer solution including the bubbles being carried out after the step of defoaming.

Method (III): A method including the steps of: suspending (dissolving and/or dispersing) fine bubbles of inert gas in an acrylic monomer solution by mixing the acrylic monomer solution with the inert gas at a stirring Reynolds number of not less than 10000 in the absence of a surface active agent or in the presence of not more than 0.003% by weight of a surface active agent to the acrylic monomer; and polymerizing the acrylic monomer solution (polymerization step).

Method (IV): A method including the steps of: suspending (dissolving and/or dispersing) fine bubbles of inert gas in an acrylic monomer solution by mixing the acrylic monomer solution with the inert gas by use of a micro bubble generator in the absence of a surface active agent or in the presence of not more than 0.003% by weight of a surface active agent to the acrylic monomer; and polymerizing the acrylic monomer solution.

Method (V): A method wherein the acrylic monomer solution has a kaolin turbidity of more than 0 but not more than 1000 [mg/L (degree)].

As to the above production methods being described in Solution to Problem, the fourth production method is preferably applied to the third production method, the first to third production methods are preferably applied to the fourth production method, and the first to fourth production methods are preferably applied to the fifth production method.

Gas employed in the present invention represents a compound that is in a state of gas at a normal temperature before used. Further, the gas employed in the present invention is different from gas generated due to a solid foaming agent (for example, carbonate or an azo compound) during the polymerization or the like. Accordingly, the acrylic monomer solution of the present invention in which bubbles are dissolved and/or dispersed is produced by directly mixing gas, preferably inert gas with a monomer solution or a material thereof (a monomer(s) and a solvent). Problems and comparative examples of the solid foaming agent are described later.

(2-1) Dissolving and Dispersing Step

The dissolving and dispersing step is a step for producing an acrylic monomer solution in which gas is dissolved and/or dispersed. The following describes in detail the dissolving and dispersing step.

(Monomer Composition)

A monomer of the present invention is not particularly limited as long as the monomer is polymerizable to water-absorbent resin powder. Examples of the monomer encompass: an anionic unsaturated monomer and a salt thereof such as (meth)acrylic acid, maleic acid (anhydride), itaconic acid, cinnamic acid, vinyl sulfonic acid, allyltoluenesulfonic acid, vinyltoluenesulfonic acid, styrenesulfonic acid, 2-(meth)acrylamide-2-methylpropanesulfonic acid, 2-(meth)acryloylethanesulfonic acid, 2-(meth)acryloylpropanesulfonic acid, or 2-hydroxyethyl(meth)acryloylphosphate; a mercapto group containing unsaturated monomer; a phenolic hydroxyl group containing unsaturated monomer; an amide group containing unsaturated monomer such as (meth)acrylic amide, N-ethyl(meth)acrylamide, or N,N-dimethyl(meth)acrylamide; an amino group containing unsaturated monomer such as N,N-dimethylaminoethyl(meth)acrylate, N,N-dimethylaminopropyl(meth)acrylate, or N,N-dimethylaminopropyl (meth)acrylamide.

These monomers may be used solely, or two or more of the monomers may be used in combination. Meanwhile, in consideration of property of produced water-absorbent resin powder or cost for producing the water-absorbent resin powder, it is preferable to use an acrylic monomer containing an acrylic acid and/or a salt thereof (preferably sodium salt, lithium salt, potassium salt, ammonium salt, amine salt or the like, more preferably sodium salt in consideration of cost) so as to produce the polyacrylic water-absorbent resin.

An amount of acrylic acid and/or salt thereof to be used so as to produce the polyacrylic water-absorbent resin powder generally accounts for not less than 50 mol % of whole monomer component (excluding the after-mentioned internal crosslinking agent), preferably not less than 70 mol %, more preferably not less than 80 mol %, yet more preferably not less than 90 mol %, most preferably not less than 95 mol % (an upper limit is 100 mol %). A polyacrylic acid of the present invention includes a polyacrylate (particularly a monovalent salt).

Further, a monomer concentration in the polymerization is not particularly limited, preferably ranges from 20% by weight to 100% by weight, more preferably ranges from 25% by weight to 80% by weight, most preferably ranges from 30% by weight to 70% by weight. A monomer concentration of less than 20% by weight in the polymerization is not preferable, because productivity is low with such a low monomer concentration. Meanwhile, in a case where the monomer concentration in the polymerization is not less than 40% by weight, preferably not less than 45% by weight, more preferably not less than 50% by weight, fine bubbles are highly stable. This particularly gives advantages to the present invention. A solvent of the monomer is water. Further, a small amount (For example, more than 0% by weight but not more than 30% by weight, preferably more than 0% by weight but not more than 10% by weight) of organic solvent may be employed in combination with the water.

In a case where the monomer is an acid radical containing monomer, a polymerized gel may be neutralized as appropriate after the polymerization with a particularly unlimited neutralization ratio. Meanwhile, in a case where the monomer is employed for a sanitary product or the like that possibly contacts with a human body, no neutralization is required after the polymerization. The acid radical containing monomer has a neutralization ratio of preferably 40 mol % to 90 mol %, more preferably 50 mol % to 80 mol %.

During the polymerization, an internal crosslinking agent is employed if necessary. Examples of the internal crosslinking agent encompass conventionally well-known internal crosslinking agents such as N,N'-methylene bis(meth)acrylamide, (poly)ethylene glycol di(meth)acrylate, (poly)propylene glycol di(meth)acrylate, trimethylol propane tri(meth)acrylate, glycerine tri(meth)acrylate, glycerine acrylate methacrylate, ethylene oxide-modified trimethylol propane tri(meth)acrylate, pentaerythritol hexa(meth)acrylate, triallyl cyanurate, triallyl isocyanurate, triallyl phosphate, triallylamine, poly(meth)allyloxy alkane, (poly)ethylene glycol diglycidyl ether, glycerol diglycidyl ether, ethylene glycol, polyethylene glycol, propylene glycol, glycerine, 1,4-butanediol, pentaerythritol, ethylene diamine, ethylene carbonate, propylene carbonate, polyethyleneimine, and glycidyl(meth)acrylate. At least one kind of the internal crosslinking agents can be employed in consideration of reactivity. Particularly, it is preferable to employ a compound having at least two polymerizable unsaturated groups.

An amount of internal crosslinking agent to be used is determined as appropriate in accordance with a desired physical property of a water-absorbent resin. Generally, the amount of the internal crosslinking agent to be used is preferably not less than 0.001 mol % but not more than 5 mol % of the whole monomer component, more preferably 0.005 mol % to 2 mol %, most preferably 0.01 mol % to 1 mol %. In a case where the amount of the internal crosslinking agent to be used is less than 0.001 mol %, water-soluble content of the water-absorbent resin powder is increased. This possibly deteriorates water-absorbency of the water-absorbent resin powder under pressure. Meanwhile, in a case where the amount of the internal crosslinking agent to be used is more than 5 mol %, crosslinking density of the water-absorbent resin powder is increased. This also possibly deteriorates the water-absorbency of the water-absorbent resin powder. The internal crosslinking agent may be added to a reaction system by adding the amount of the internal crosslinking agent at once, or by portions.

(Method for Dissolving and/or Dispersing Gas)

An example of the method for suspending fine bubbles of inert gas in a monomer solution in the methods (III) to (IV) is a method for mixing a fluid of the monomer solution and a fluid of the inert gas with each other by ejecting one of the fluids into the other of the fluids through a nozzle. Note that the fluids are liquid or gas that is moved by a stir or pressure (applying or reducing pressure), preferably liquid or gas that is flown in a pipe by application of pressure. The monomer solution and the inert gas may be mixed with each other by connecting a pipe in which the monomer solution flows and a pipe in which the inert gas flows with each other. As an alternative, the monomer solution and the inert gas may be mixed with each other by injecting one of the monomer solution and the inert gas which flows in a pipe into the other of the monomer solution and the inert gas which is stored in a vessel (tank).

Some employable specific methods are: a method for making a co-current flow of the inert gas injected though a nozzle and the monomer solution ejected from the other nozzle via a pipe or a vessel; a method for making a co-current flow of the monomer solution ejected through a nozzle and the inert gas ejected from the other nozzle, and like methods. As an alternative, the inert gas may be blown directly into the monomer solution. In a case where the fluids are mixed with each other, directions of the fluids to be injected are not particularly limited. The fluids may be mixed such that the fluids are injected cocurrently to each other, the fluids are injected countercurrently to each other, or the fluids are injected perpendicularly to each other. Meanwhile, the fluids are preferably mixed such that the fluids are injected cocurrently to each other because bubbles can be evenly suspended.

Further, bubbles may be injected into an acrylic monomer solution by injecting bubbles into a prepared acrylic monomer solution, or by injecting bubbles into each of materials of an acrylic monomer solution and then preparing the acrylic monomer solution with use of the materials including bubbles. In a case where the bubbles are injected into the materials, an acrylic acid, water, an acrylate solution, a crosslinking agent or the like, preferably water, an acrylate solution or an acrylic monomer solution prepared by use of the water or the acrylate solution can be employed as the materials.

According to the methods (III) and (IV), the fine bubbles of the inert gas are suspended in the monomer solution by mixing the monomer solution and the inert gas with each other at stirring Reynolds number of not less than 10000. In a case where a fluid of a monomer solution and a fluid of inert gas are mixed with each other by another method, it is desirable that the mixed fluid be subject to shearing stress and great turbulence so that a desired stirring Reynolds number is obtained. The desired stirring Reynolds number is preferably not less than 10000, more preferably not less than 20000, most preferably not less than 30000. An upper limit of the stirring Reynolds number is determined as appropriate. Meanwhile, in consideration of balance with another physical property, the upper limit of the stirring Reynolds number is preferably not more than 10 million, more preferably not more than one million, most preferably not more than half million. A technique for mixing inert gas with a monomer solution and then deaerating the monomer solution is conventionally well-known as described in Japanese Patent Application Publication Tokukai No. 2005-162834 A or the like. However, Japanese Patent Application Publication Tokukai No. 2005-162834 A or the like does not disclose turbulent mixing of the monomer solution with which the inert gas is mixed.

Calculation of stirring Reynolds number is described later. A method for stirring a monomer roughly includes a method for mechanically stirring the monomer and a method for statically stirring the monomer. In a case where the monomer is mechanically stirred (by use of stirring blades), the stirring Reynolds number is obtained by the after-mentioned formula 9. Further, in a case where the monomer is statically stirred, the stirring Reynolds number is obtained by the after-mentioned formula 8. What is meant by mechanical stirring is rotation stirring due to rotation of the stirring blades, rotation of a vessel itself or the like. Further, what is meant by static stirring is nonmechanical stirring, that is, stirring due to rotation of a fluid, the fluid being rotated by a fixed member such as a spiral provided in a pipe or a vessel. A static mixer or a spiral mixer is typically employed for the static stirring.

A device suitable for obtaining the stirring Reynolds number is not particularly limited. Examples of the device encompass a mechanical stirring in-line mixer and a static in-line mixer. Particularly, the static in-line mixer does not require any accessories such as stirring power or the like. Therefore, the static in-line mixer, what is called a static mixer is preferably employed. The static mixer may be provided in one place or a plurality of places of a pipe. In a case where the plurality of static mixers are provided in the pipe, the static mixers may be connected in series or parallel with each other. In order to obtain a stirring Reynolds number of not less than 10000 by use of the static mixer, a flow rate at which a monomer solution flows is increased. The flow rate of the monomer solution is preferably not less than 500 kg/hr, more preferably not less than 1000 kg/hr, most preferably not less than 2000 kg/hr. An upper limit of the flow rate of the monomer solution is determined as appropriate. Meanwhile, in consideration of balance with another physical property, the upper limit of the flow rate is, for example, not more than 300 ton/hr, preferably not more than 100 ton/hr, more preferably not more than 80 ton/hr. Accordingly, the production method of the present invention is preferably applicable to continuous production, particularly applicable to continuous production for producing within the above-described range.

U.S. Pat. No. 7,265,190 (family Japanese Patent No. 2004-155963) and FIGS. 1 to 3 thereof disclose a method for mixing a polymerization initiator with a monomer solution that is in a stirring state, specifically a method for mixing the polymerization initiator in a case where a desired stirring Reynolds number is not less than 50 (the stirring Reynolds number is 2280 in Examples), so as to continuously polymerize a water-absorbent resin. However, U.S. Pat. No. 7,265,190 neither suggests the stirring Reynolds number in a case where the foam polymerization is carried out with inert gas or in a case where the fluid of the monomer solution and the fluid of the inert gas are mixed with each other nor discloses the foam polymerization in which the stirring Reynolds number is not less than 10000 during mixing inert gas. The stirring Reynolds number of 2280 (an upper limit of stirring Reynolds number in Examples) disclosed in U.S. Pat. No. 7,265,190 is effective for mixing of the polymerization initiator but not sufficiently effective in the attempt of increasing the water-absorption rate by the foam polymerization, as described in Comparative Example 18 of the subject application.

Further, Japanese Patent Application Publication Tokukai No. 2001-151804 A discloses neither polymeric powder nor the water-absorbent resin, but discloses a method for producing a porous article (preferably having an average pore diameter of 0.5 mm to 2.0 mm) by (i) mixing a monomer solution containing a water-soluble vinyl monomer, a crosslinking agent, a surface active agent and an acid with an alkaline solution containing a polymerization initiator and at least one salt selected from among a group including carbonate and bicarbonate, and (ii) immediately mechanically stirring the resultant solution at stirring Reynolds number of $2.8 \times 10^4$ to $6.0 \times 10^4$, so as to obtain an organism immobilization support for wastewater treatment or the like. However, bubbles foamed due to carbonate and bicarbonate described in Japanese Patent Application Publication Tokukai No. 2001-151804 A (organism immobilization support for wastewater treatment), Patent Literatures 11 to 18 and the like cannot be finely controlled as bubbles of the present invention. Particularly, it is difficult to control the bubbles foamed due to carbonate and bicarbonate to have a diameter of not more than 100 μm. Further, the water-absorption rate is not sufficiently increased by foam polymerization due to carbonate, as described in Comparative Examples 5 and 17 of the subject application.

The method for dissolving and/or dispersing the gas in the step of producing the acrylic monomer solution of the method (I) is at least one selected from among the following methods (a) to (c) of:

(a) applying pressure to the acrylic monomer solution and the gas;

(b) creating swirling flows of the acrylic monomer solution and the gas; and (c) introducing the gas with the acrylic monomer solution via fine holes. The following describes the above methods (a) to (c).

A foamed polymer can be obtained as long as bubbles are present when the polymerization is started or during the polymerization. Accordingly, in dissolving and/or dispersing bubbles of the present invention, the bubbles can be dispersed in a monomer solution or a polymerization gel by, when the polymerization is started or during the polymerization, increasing a temperature of the monomer solution in which bubbles are dissolved in such a manner as to generate bubbles. It is further preferable that some of the dispersed bubbles are dissolved.

(a) Applying pressure to a monomer solution and gas

Gas is preferably dissolved by applying pressure to a monomer solution and gas, as a first method for dissolving and/or dispersing the gas. Specifically, the gas is dissolved in a liquid by applying absolute pressure of 100 kPa to 1000 kPa, preferably 200 kPa to 400 kPa, more preferably 250 kPa to 350 kPa. Thereafter, the resultant liquid is flushed through a pressure reducing valve, whereby the gas oversaturated in the liquid due to depressurization is emitted from the liquid as micro bubbles. Amount of gas to be dissolved in the liquid is obtained on the basis of a temperature and a pressure by means of Henry's law (p=HC). Bubbles are dissolved by applying the pressure, and then dispersed.

Further, it is preferable that shearing force is further applied as appropriate to a mixture of the monomer solution and the gas prior to or during applying the pressure so as to control dissolving and/or dispersing the bubbles. Specifically, the shearing force is applied to the mixture by use of a high-rate rotating pump or the like. It is preferable that the gas is minutely dispersed by the shearing force and further pressurized. Specifically, the monomer solution and the gas is subject to the shearing force, pressurized at 0.1 MPa to 1 MPa, and then exposed to atmospheric pressure as described later.

(Oversaturation)

An example of the method for dissolving by applying the pressure is a method for oversaturating a monomer solution with gas in the step of producing the acrylic monomer solution. A concentration of the gas dissolved and/or dispersed in the acrylic monomer solution is preferably 1.01 times to 10 times, more preferably 1.05 times to 5 times, most preferably 1.06 times to 3 times of saturation solubility of the gas at a predetermined temperature.

(b) Creating Swirling Flows of a Monomer Solution and Gas

Other than the method for dissolving by applying the pressure (first method), the gas can be preferably dissolved and/or dispersed by creating swirling the flows of the monomer solution and the gas, as a second method for dissolving and/or dispersing the gas. Specifically, bubbles are dispersed at an outlet (discharging opening of a mixer) by rotating a gas and liquid fluid. The ratio of gas fluid quantity to liquid fluid quantity is preferably in the range of 1:7 to 1:15. The rotation rate is preferably 10 rev to 10000 rev per second, more preferably 100 rev to 1000 rev per second.

A swing type fine air bubble generator is described as an example in International Patent Application Publication No. WO00/69550, Japanese Patent Application Publication Tokukai No. 2003-205228, Japanese Patent Application Publication Tokukai No. 2000-447, Japanese Patent Application Publication Tokukai No. 2006-116365, and the like. However, the swing type fine air bubble generator applicable to the present invention is not particularly limited to these.

(c) Mixing Gas into a Monomer Solution Via Fine Holes

A method for generating bubbles from fine holes of various porous materials, a film, a filter or the like is employed as a third method for dissolving and/or dispersing the gas. For example, a porous glass ($Na_2O$—Ca—O—$Al_2O_3$—$B_2O_3$—$SiO_2$ glass) is used. Preferably, a surface active agent with a weight described later such as more than 0 but not more than 0.03% by weight is used. For Example, a Kinoshita glass ball filter (filter particle No. 4) manufactured by Kinoshita Rika Kogyo Co., Ltd. may be used for the method.

(Micro Bubble Generator)

In the method (IV), the monomer solution and the inert gas are mixed with each other by use of a micro bubble generator. Further, in the methods (I) to (III), the monomer solution and the inert gas may be mixed with each other by use of a micro bubble generator having a function of pressurizing the monomer solution and the inert gas or generating the swirling flows of the monomer solution and the inert gas. This makes it possible to suspend and retain generated micro bubbles in the monomer solution until the polymerization is started. The micro bubbles are generated by at least one of the aforementioned methods (a) to (c) and the after-mentioned methods (1) to (8). The micro bubbles are preferably generated by the method (a) or (b). More preferably, the micro bubbles are generated by the method (a). Further, the shearing force is further applied if necessary.

The micro bubble generator employed in the present invention is not particularly limited. A commercialized micro bubble generator can be employed. The following describes, as an example, the commercialized micro bubble generators. A concrete example where an OHR line mixer is employed is described in Example 14.

OHR LINE MIXER (OHR LABORATORY CORPORATION)

M-type micro bubble generating device (NANOPLANET)

Micro bubble generating device SMB-450 for industrial use (Ishimaru Shogyo Yugengaisha)

Micro bubble generating device Mbelife (Kansai Automation Equipment Co., Ltd.)

Bubble generating device MBG-type in which a sphere is incorporated (NISHIDA TEKKO CORPORATION)

Canned motor pump (TEIKOKU ELECTRIC MFG. CO., LTD.)

A micro bubble generator is provided with an inlet and an outlet. In a case where a liquid (water or a monomer) is flown into the micro bubble generator through the inlet at a pressure equal to or more than a predetermined pressure, gas contained in the liquid is gathered in a center part of the liquid due to density difference so as to form a gas axis. This generates pressure gradient between the center part and a periphery of the center part in the micro bubble generator. At this time, a center part of the gas axis is substantially under vacuum, and water to be ejected by pressurization and water to be flown into the gas axis that is under vacuum (under super-negative pressure) collide with each other, and rotate. In a case where the gas axis passes through the water, the gas is finely sheared to be micro bubbles.

The micro bubbles generated by the micro bubble generator of the present invention have an average diameter of preferably not less than 50 nm (preferably 10 μm) but not more than 500 μm, more preferably 100 nm (preferably 10 μm) to 100 μm. In a case where the average diameter of the micro bubbles is less than 50 nm, the bubbles are closed in the water-absorbent resin powder (independent bubbles). This possibly results in poor water-absorbency of the water-absorbent water resin powder. Meanwhile, in a case where the average diameter of the bubbles is more than 500 μm, it is impossible to increase a surface area of the water-absorbent resin powder. This possibly results in poor water absorbency or fragile strength of the water-absorbent resin powder.

Further, an amount of the micro bubbles to be generated by the micro bubble generator can be determined as appropriate in accordance with a desired physical property or the like of the water-absorbent resin powder. Meanwhile, it is desirable that a flow rate at which the monomer solution flows be increased. The flow rate of the monomer solution is preferably 500 [kg/hr], more preferably 1000 [kg/hr], most preferably 2000 [kg/hr]. An amount of the micro bubbles to be generated per hour is not limited to employing the micro bubble generator. In general, the production method of the present invention is suitably applicable to large-scale industrial production. An upper limit of the flow rate of the monomer solution is determined as appropriate. Preferably, the upper limit is in the above-described range (for example, not more than 300 ton/hr). Accordingly, the production method of the present invention is preferably applicable to continuous production, more preferably applicable to continuously producing the above-described quantity of the micro bubbles.

(Other Methods Employed in Combination as Appropriate)

For the production method of the present invention, the following methods (1) to (8) can be singularly employed or employed in combination, other than the above-described methods (a) to (c) and the micro bubble generator.

(1) Static Mixer

Examples of the static mixer encompass: a static mixer which includes no movable member and is configured to mix a fluid that passes through an element fixed inside a tube of the static mixer; and an OHR line mixer for generating micro bubbles by crushing a gas and liquid fluid that is rotationally flown by (i) a spiral flow inductive member provided in a circular tube of the OHR line mixer and (ii) a mushroom-shaped projection provided in a tube of the OHR line mixer. A concrete example in which the static mixer is employed is described in the following Examples 13 and 15.

(2) Cavitation

The micro bubbles are generated by deforming a flow path such that cavitation is intentionally generated in a gas dispersing device.

(3) Using in Combination with a Centrifugal Pump and a Swirl-Type Micro Bubble Generator The gas is dissolved in a liquid by vortex flow stirring of a pump and increasing a pressure by use of a pump. Thereafter, gas that is not dissolved is made into micro bubbles by use of a swirl-type micro bubble generator.

(4) Venturi

Simultaneously flowing gas and liquid into a straw section (constricted section) causes a rapid change in a liquid rate. This generates shock wave. This shock wave explodes bubbles. In this manner, the micro bubbles are generated.

(5) Rotation

The micro bubbles are generated by rotating stirring blades at high rate so as to generate gas.

(6) Supersonic Waves

The micro bubbles are generated by determining as appropriate an ultrasonic frequency, a pressure amplitude or the like.

(7) Phase Change

Mixed gas that contains gas (nitrogen gas) and water vapor is blown into a liquid through a thin nozzle. This causes the water vapor to condense while causing gas (nitrogen gas) that does not condense to be left as bubbles.

(8) Electrolysis

Bubbles having micro order in diameter are generated by electrolyzing water.

In consideration of an effect, it is preferable to further shear the gas and liquid fluid containing the monomer solution and the gas in the step of producing the acrylic monomer solution. In order to shear the gas and liquid fluid, (3) using in combination with a centrifugal pump and a swirl-type micro bubble generator, or a static mixer such as an OHR mixer that generates shearing force and swirling flow is employed.

In the method (II), at least any one of the methods (1) to (8), the above described methods (a) to (c) and the micro bubble generator can be employed as appropriate in order to dissolve and/or disperse gas.

(Time Period for Releasing Pressure)

In a case where the method (a) for dissolving by applying the pressure, or the micro bubble generator is employed for generating the bubbles, quantity and size of the bubbles are controlled by applying a pressure (preferably, 0.1 MPa to 1 MPa (absolute pressure) described in the method (a)) greater than atmospheric pressure to the gas and the monomer solution and then exposing the gas and the monomer solution to the atmospheric pressure (alternatively, reduced pressure, specifically a pressure reduced by not more than 10 mmHg). It is preferable to control the bubbles by controlling the pressure to be applied, a temperature, and a time period for pressure release for exposing to atmospheric pressure, particularly the time period for the pressure release for exposing to atmospheric pressure. Such a control makes it possible to produce the water-absorbent resin having an objective water-absorption rate, and excellent liquid permeability and impact resistance.

One suitable example of the generation of the bubbles is such that, a pressure is applied in the method (a), (b) or (c), or in the micro bubble generator, that is, the pressure greater than atmospheric pressure is applied in a tube or the device in preparing a monomer solution by mixing the acrylic acid or a salt thereof, the solvent, the crosslinking agent, and/or the polymerization initiator, and then the resultant monomer solution is supplied into a polymerization device, in which the monomer solution is then subject to atmospheric pressure when the polymerization is started.

That is, in micro bubble generation mechanisms, dispersed bubbles are expanded and combined due to pressure release. An amount of the bubbles to be expanded and combined determines the quantity and size of the bubbles to be left in the polymerization gel in the end. It is important to determine a time period required from exposing to atmospheric pressure a supplied reaction liquid to which the pressure is applied through gelatinizing the supplied reaction liquid to fixing the bubbles of the supplied reaction liquid in a case where a time period required from exposing to atmospheric pressure the monomer solution to which the pressure is applied to start of the polymerization is set T1 (second). Further, it is preferable to control as follows by controlling as appropriate the temperature, the polymerization initiator or the like. Namely, it is preferable that $0<T1<T$, more preferably $0<T1<\frac{1}{2}T$.

T1 is a time period required from the exposure to atmospheric pressure to the start of the polymerization. Meanwhile, T is a time period required from the exposure to atmospheric pressure to recovery of a kaolin turbidity to a level before the gas is dissolved or dispersed in the monomer solution.

T1 is determined by clouding (due to generation of a polymer) of the monomer solution or increase in temperature (by not less than 1° C.) due to polymerization heat. Meanwhile, T is determined by a time period (T) required for, in the following 100 ml measuring cylinder, dispersing bubbles into the monomer solution containing no initiator, allowing the monomer solution to stand at a normal temperature under atmospheric pressure, and then eliminating clouding caused by the bubbles. Note that the clouding is generally caused by bubbles greater than a wavelength of visible light. The following clouding (kaolin turbidity) describes that nano bubbles do not substantially affect the clouding.

A lower limit of T1 is determined as appropriate. Preferably, the lower limit of T1 is the following time period necessary for defoaming (specifically not less than 5 seconds, more preferably 10 seconds to 3600 seconds). Meanwhile, an upper limit of T1 is determined by a monomer composition including quantity of a surface active agent, and how to generate the bubbles.

(Gas)

Examples of the gas employed in the dissolving and/or dispersing step of the methods (I) and (II) encompass oxygen, air, nitrogen, carbon dioxide, ozone, and a mixture thereof. In consideration of polymeric performance, inert gas such as nitrogen or carbon dioxide is preferably employed. Amount of inert gas to be employed is preferably not less than 80% by volume, more preferably 99% by volume, yet more preferably 99.9% by volume, most preferably 99.99% by volume. Further, the pressure to be applied is selected as appropriate from among normal pressure, increased pressure and reduced pressure.

The inert gas employed in the dissolving and/or dispersing step of the methods (III) to (V) is not particularly limited. Examples of the inert gas encompass nitrogen, argon, helium, and carbon dioxide. Among these, nitrogen is preferably employed because it is low in cost. Further, according to the present invention, the inert gas to be employed in order to generate fine bubbles in the monomer solution is less in quantity than that employed in a conventional method.

(Surface Active Agent)

In the dissolving and/or dispersing step of the methods (I) to (V), the monomer solution and the inert gas may be mixed with each other in the presence of a surface active agent. Employing the surface active agent makes it possible to stably suspend the bubbles.

It is further possible to produce the water-absorbent resin powder having a desired physical property by adjusting as appropriate the type or quantity of the surface active agent to be employed. Meanwhile, employing the surface active agent is not necessarily required. Even in a case where the surface active agent is not employed, the monomer solution and the inert gas can be mixed with each other.

Such a surface active agent is not particularly limited. Examples of the surface active agent encompass an anionic surface active agent, a nonionic surface active agent, a cationic surface active agent, an ampholytic surface active agent, a fluorocarbon surface active agent, and an organic metal surface active agent. Specifically, surface active agents described in Japanese Patent Application Publication, Tokukaihei No. 10-251310 can be employed as the surface active agent of the present invention.

In a case where the surface active agent is employed, the amount of the surface active agent to be employed for a monomer to be used is preferably more than 0 but not more than 0.03% by weight, more preferably more than 0 but not more than 0.015% by weight, yet more preferably more than 0 but not more than 0.01% by weight, most preferably more than 0 but not more than 0.003% by weight. The above-described amount of the surface active agent to be employed is also applied to the water-absorbent resin powder to be produced. In a case where the surface active agent is overused, it is possibly difficult to control the foaming. Further, overusing the surface active agent causes extreme deterioration in surface tension of the water-absorbent resin. This is not suitable for practical usage of the water-absorbent resin in disposable diapers. Meanwhile, an extremely small amount of the surface active agent to be employed improves the physical property of the water-absorbent resin in which surface crosslinking is carried out or of which powder is transported. Therefore, preferably more than 0 ppm, more preferably not less than 0.1 ppm, yet more preferably not less than 1 ppm of the surface active agent is employed.

(Turbidity of Monomer Solution)

According to the present invention, large bubbles in the monomer solution to be polymerized after defoamed as appropriate not only do not contribute to the water-absorption rate but also cause fine powder to be generated during crush. However, the water-absorbent resin powder of the present invention does not include many large bubbles (holes). Therefore, the water-absorbent resin of the present invention is uniform in shape and has an improved tolerance to damage. Meanwhile, it is well-known that in a case where surface-crosslinked water-absorbent resin powder is transported or employed for disposable diapers, the surface-crosslinked water-absorbent resin powder is superficially damaged whereby a physical property thereof is deteriorated. Further, the damage tolerance of the water-absorbent resin powder (deterioration in the physical property due to damage) is described in Patent Literatures 32 and 29 (paint shaker testing), Patent Literature 29 (Fragility Index), Patent Literature 34, Patent Literature 34 (SDOV testing), and the like, all Patent Literatures of which are described in Background Art of the present specification. On this account, the bubbles are preferably fine, specifically micro bubbles or nano bubbles, more preferably micro bubbles only.

Generally, an aqueous solution that contains a great deal of bubbles is turbid. Meanwhile, in a case where such nano bubbles in an aqueous dispersion have a particle diameter shorter than visible light, the aqueous dispersion is transparent. Therefore, a turbidity of a monomer solution can be employed as an indicator of fineness of the bubbles of the present invention.

A kaolin turbidity of the monomer solution of the present invention to be supplied into a polymerization device is preferably more than 0 but not more than 1000 [mg/L (degree)] (generally apparently turbid), more preferably in the following order, not more than 500 [mg/L (degree)], not more than 300 [mg/L (degree)], not more than 100 [mg/L (degree)], not more than 50 [mg/L (degree)], and not more than 20 [mg/L (degree)] (apparently substantially transparent). In consideration of the water-absorption rate, a lower limit of the kaolin turbidity is preferably not less than 0.001 [mg/L (degree)], more preferably not less than 0.1 [mg/L (degree)], yet more preferably not less than 1 [mg/L (degree)].

An excessively high turbidity of the monomer solution does not sufficiently contribute to improvement of the water-absorption rate. Further, in the case of in the excessively high turbidity of the monomer solution, large bubbles cause deterioration in impact resistance, or cause fine powder to be generated during crush. According to conventional foam polymerization (Patent Literatures 11 to 18), a monomer solution that was turbid due to inclusion of a great deal of bubbles was polymerized. Meanwhile, according to the present invention, it was found that it is possible to produce the water-absorbent resin more excellent than those of Patent Literatures by employing the monomer solution that is less turbid or substantially transparent. That is, it was found that the present invention allows foam polymerization of an apparently substantially transparent monomer solution and makes it possible to provide the water-absorbent resin having a suitable liquid permeability and an improved bulk specific gravity.

Further, in the following defoaming step, large bubbles are eliminated while fine bubbles remain. This makes it possible to produce the monomer solution including preferably micro bubbles or nano bubbles, more preferably micro bubbles only. Selectively eliminating the large bubbles as described above makes it possible to produce a transparent aqueous solution. Therefore, the turbidity of the monomer solution of the present invention is applicable as an index for defoaming.

The kaolin turbidity is reduced (clarified) in the defoaming step of the present invention in the range of preferably not less than 10 [mg/L (degree)], more preferably not less than 20 [mg/L (degree)], yet more preferably not less than 50 [mg/L (degree)], most preferably not less than 100 [mg/L (degree)]. The kaolin turbidity obtained after the defoaming step is preferably within the above-described range (more than 0 but not more than 1000 [mg/L (degree)]).

In a case where the kaolin turbidity is not sufficiently reduced in the defoaming step, the water-absorption rate is not sufficiently improved. Meanwhile, in this case, the large bubbles cause generation of fine powder during crush, or cause deterioration in impact resistance of the water-absorbent resin.

The present invention relates to a polyacrylic water-absorbent resin powder production method including the steps of: producing an acrylic monomer solution in which gas is dissolved and/or dispersed; if necessary, defoaming to eliminate some of bubbles included in the acrylic monomer solution; polymerizing the acrylic monomer solution including bubbles in the absence of a surface active agent or in the presence of not more than 300 ppm of a surface active agent; during or after the step of polymerizing, fragmenting a hydrated gel crosslinked polymer obtained by polymerizing the acrylic monomer solution; and drying by heat the hydrated gel crosslinked polymer thus fragmented, the acrylic monomer solution having a kaolin turbidity of more than 0 but not more than 1000 [mg/L (degree)].

Such a production method yields the above-described effect. The monomer solution of the present invention is preferably defoamed. The aforementioned or after-mentioned other detailed production conditions are applied.

(2-2) Defoaming Step

The method (II) includes the step of defoaming some bubbles included in the monomer solution produced in the dissolving and/or dispersing step. Further, it is preferable that the methods (I), (III) to (V) also include the defoaming step.

Whether or not, or how much the defoaming step is carried out can be checked on the basis of the turbidity of the monomer solution, deterioration in expansivity or the like.

Carrying out the deforming step makes it possible to eliminate from the monomer bubbles in order of size from largest bubbles thereby suppressing excessive foaming and deterioration in bulk specific gravity. A time period for defoaming is preferably not less than 5 seconds. In a case of an open system, the time period for defoaming is more preferably 10 seconds to 60 minutes, yet more preferably 30 seconds to 30 minutes, most preferably 60 seconds to 20 minutes. The time period for defoaming is adjusted such that objective fine bubbles remain in the monomer solution. An example of a preferable defoaming method is a method for employing a circulating tank shown in FIGS. 6 and 7. Another preferable defoaming method is a method for keeping, under normal pressure for a predetermined time period, the monomer solution in which bubbles are introduced (preferably, after the pressure is applied to the gas and the monomer solution). Further, the monomer solution is preferably exposed to atmospheric pressure at a temperature of preferably 0° C. to 100° C., more preferably 20° C. to 50° C.

The monomer obtained after the defoaming step is defined by (i) the size of bubbles (having a volume average diameter of preferably not more than 100 μm, more preferably not more than 50 μm, yet more preferably not more than 20 μm, most preferably not more than 5 μm), and (ii) the following expansivity compared to that of an acrylic monomer solution in which no gas is dissolved and/or dispersed. The expansivity is preferably not more than 1.1 times, more preferably not more than 1.05 times, yet more preferably 1.02 times, most preferably not more than 1.01 times. A lower limit of the expansivity is generally more than 1 time, preferably not less than 1.001 times, more preferably 1.002 times.

Reduction (clarification) in the expansivity in the defoaming step of the present invention (difference in expansivities obtained before and after the defoaming step) is preferably not less than 0.001, more preferably not less than 0.01, most preferably not less than 0.02. The expansivity obtained after the defoaming step is preferably the above-described range (not more than 1.1 times). In a case where the turbidity is not sufficiently reduced in the defoaming step, the water-absorption rate is not sufficiently improved. Further, in this case, the large bubbles cause generation of fine powder during crush, or cause deterioration in impact resistance of the water-absorbent resin.

Patent Literature 23 (U.S. Pat. No. 6,107,358) discloses a method for producing a water-absorbent resin, wherein a monomer solution in which inert gas bubbles are dispersed is polymerized to have a volume 1.02 times to 5 times as large as a volume attained by polymerization of a monomer solution in which no inert gas bubbles are dispersed. Meanwhile, the present invention makes it possible to produce a more excellent water-absorbent resin having a lower expansivity by means of a method that is not disclosed in Patent Literature 23, compared to the water-absorbent resin disclosed in Patent Literature 23. Patent Literature 23 is also described in Comparative Example 4.

A conventionally well-known defoaming technique can be employed for the defoaming step of the present invention. For example, a method described in the specification of U.S. Pat. No. 6,667,372, or a method described in pages 759 to 774 "Concepts in Basic Bubbles and Foam Engineering" issued by Techno System Co. Ltd. can be employed.

A preferable defoaming step is attained by circulating, in a circulating tank, circulating gas flow containing the monomer. Further, in the defoaming step, the circulating tank has an upper space in which oxygen is not less than 1% by volume. The polymerization is carried out by circulating the gas flow containing the monomer, neutralizing at least a part of the monomer of the gas flow supplied from a circulating line, and then supplying, to a polymerization step, the gas flow containing the monomer at least a part of which is neutralized.

Figure 6:
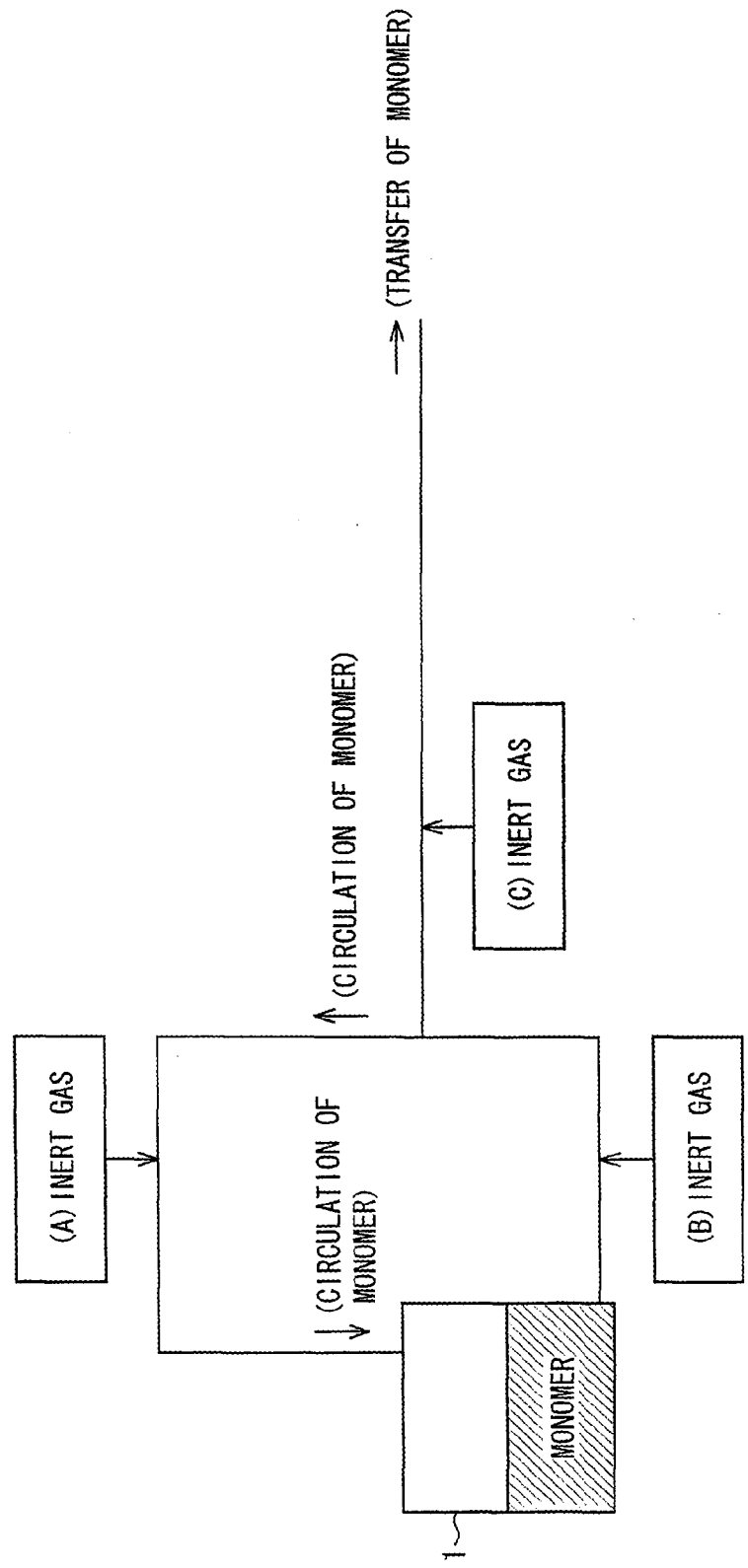
FIG. 6 is a flowchart showing a step of defoaming a monomer solution including inert gas by circulating the monomer solution in a circulatory tank.
Figure 7:
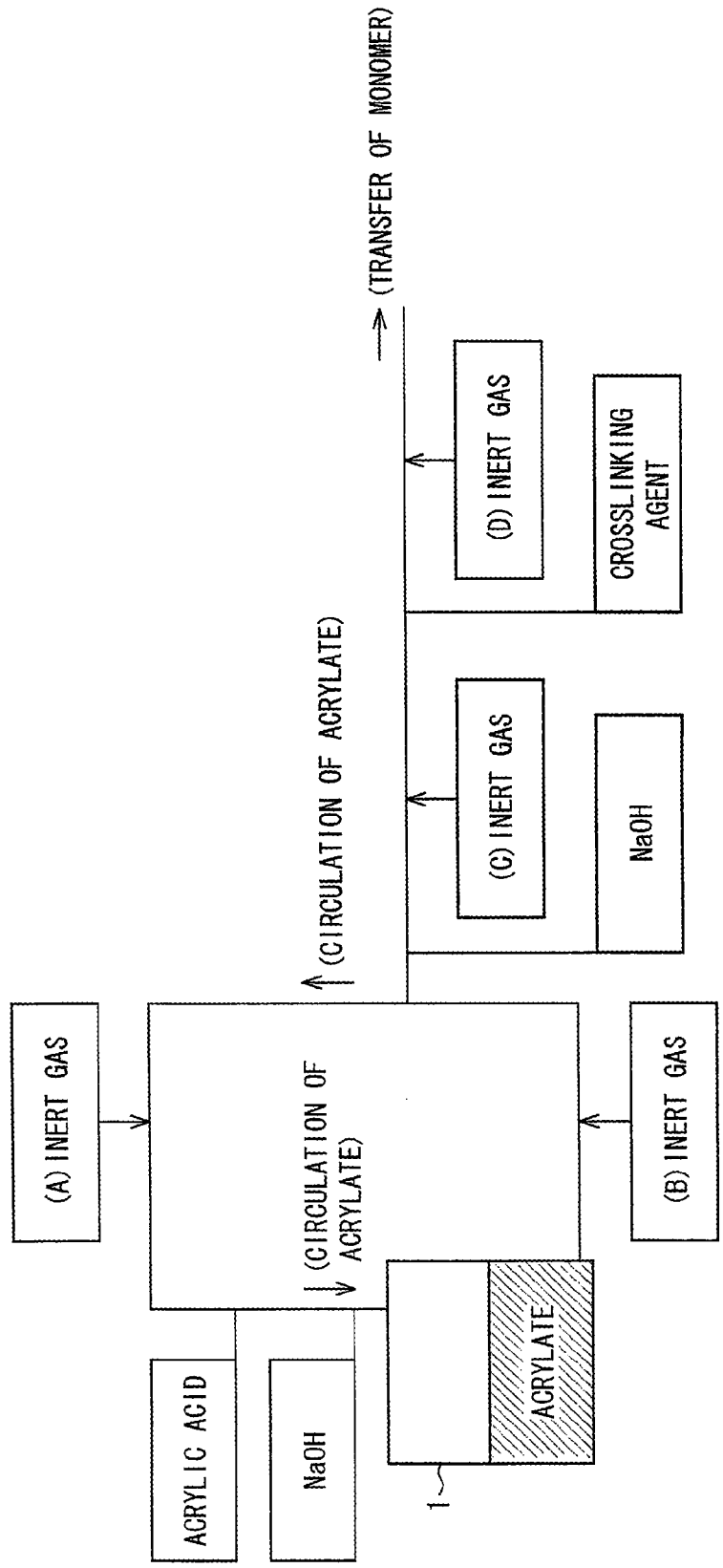
FIG. 7 is a flowchart showing another step of defoaming a monomer solution including inert gas by circulating the monomer solution in a circulatory tank.

Each of FIGS. 6 and 7 illustrates the defoaming step. Note that a circulating pump, a heat exchanger and the like are omitted in FIGS. 6 and 7.

As shown in FIG. 6, a monomer stored in a tank 1 is flown from a lower part of the tank 1 into a circulation line, circulated in the circulation line while having introduced inert gas therein, and are flown into the tank 1 from an upper part of the tank 1. Since the monomer circulates in the circulation line while having introduced inert gas therein, the inert gas is dissolved and/or dispersed in the monomer. The monomer in which the inert gas is dissolved and/or dispersed is then flown into the tank 1, and stored in the tank 1 until flown into the circulation line. The monomer stored in the tank is defoamed.

FIG. 7 shows a defoaming step in which a monomer is defoamed while neutralized. As shown in FIG. 7, the monomer thus neutralized in the tank 1 is flown from a bottom part of the tank 1 into a circulation line while having introduced inert gas therein, and flown into the tank 1 from an upper part of the tank 1. In this manner, the monomer is defoamed while circulated.

Further, as shown in FIG. 6, the defoamed monomer can be transferred to a successive step as it is. Alternatively, as shown in FIG. 7, the defoamed monomer to which a neutralizing agent or a crosslinking agent is added can be transferred.

The circulation tank is described in International Patent Application Publication No. WO2007/28746, International Patent Application Publication No. WO2007/28747, and International Patent Application Publication No. WO2009/123197. Meanwhile, according to the present invention, as shown in FIGS. 6 and 7, the inert gas is dissolved or dispersed in the monomer solution that is not circulated, and then the monomer solution is further circulated in the tank. This makes it possible to uniform and stabilize the bubbles. In this case, the circulation tank may be filled up with the inert gas. In consideration of stability of the monomer, the circulation tank is preferably filled up with oxygen, particularly air.

In the alternative, the bubbles can be eliminated as follows. The bubbles are accumulated in a tube or a polymerization device for a predetermined time period before the polymerization. Further, the monomer including bubbles can be defoamed by preferably low rate stirring, stirring at particularly 1 rpm to 100 rpm, more preferably 10 rpm to 80 rpm. Meanwhile, in a case where the monomer is defoamed by high rate stirring, large bubbles tend to be generated. Therefore, no stirring, preferably low rate stirring is important in the defoaming step.

Specifically, the process may be carried out as follows. The monomer solution containing bubbles is supplied into a polymerization device whose top part is open, and then large bubbles are mainly eliminated from the monomer solution. As a result, a monomer solution mainly containing fine bubbles is obtained. After a predetermined time elapses, a polymerization initiator is added to the monomer solution containing fine bubbles, or the monomer solution containing fine bubbles is irradiated with ultraviolet rays. A preferable defoaming step may be carried out by, for a predetermined time period (for example, 60 seconds to 20 minutes) at an early stage in a polymerization device, carrying out low rate stirring in a case of continuous kneader polymerization, or carrying out no stirring in a case of continuous belt polymerization.

In a case where a monomer solution containing excessively large bubbles is employed in order to produce the water-absorbent resin, the water-absorbent resin thus produced has a scaly shape, or not only an extremely low bulk specific gravity (for example, particularly not more than 0.5 [g/cm$^3$]) but also low liquid permeability and impact resistance. Further, it is possibly difficult to produce a water-absorbent resin having a water-absorbency index of not less than 90 though producing such a water-absorbent resin is an object of the present invention.

Any one of the above-described defoaming methods can be employed. Meanwhile, the present invention is not intended to completely defoaming but intended to producing the monomer solution mainly containing fine bubbles from which monomer solution large bubbles are mainly eliminated. In this manner, the water-absorbent resin obtained after the defoaming step becomes a porous polymer that has fine and uniform pores.

In the generated micro bubbles, concentrated ions affect interfaces of the generated micro bubbles. This generates electrostatic repulsion thereby preventing dissipation of gas included in the micro bubbles. Further, nano bubbles may be generated by crushing by pressure the micro bubbles by means of self-pressurization or adiabatic compression.

A climbing rate and an internal pressure of a micro bubble are obtained by Stokes formula and Laplace equation ($P_b = P_f + 2\sigma/r$), respectively. Specifically, in a case where a bubble has a diameter of 100 μm, the bubble has a climbing rate of 5400 [μm/s] and an internal pressure of $1.04 \times 10^5$ Pa. Further, in a case where a bubble has a diameter of 10 μm, the bubble has a climbing rate of 54 [μm/s] and an internal pressure of $1.31 \times 10^5$ Pa. Furthermore, in a case where a bubble has a diameter of 1 μm, the bubble has a climbing rate of 0.54 [μm/s] and an internal pressure of $3.95 \times 10^5$ Pa.

An expansivity of a monomer under normal pressure in the polymerization step is preferably not more than 1.1 times, more preferably not more than 1.05 times, yet more preferably not more than 1.02 times, particularly preferably not more than 1.01 times, most preferably 1.00 time (preferably more than 1 time, particularly not less than 1.001 times), compared to that of an acrylic monomer solution in which gas is not dissolved and/or dispersed. Conventionally, a method for polymerizing by dispersing a great amount of bubbles has been well-known. Meanwhile, according to the method of the present invention, it is possible to polymerize without extremely dispersing the bubbles. This hardly causes deterioration in bulk specific gravity.

The method of the present invention enables the monomer solution to contain micro bubbles having a volume average diameter of not more than 100 μm or nano bubbles in the polymerization step. The micro bubbles or nano bubbles included in the monomer solution have a volume average diameter of preferably not more than 100 μm, more preferably not more than 50 μm, yet more preferably not more than 20 μm, most preferably not more than 5 μm. Bubbles having a large particle diameter do not greatly contribute to the water-absorption rate, and causes excessive deterioration in bulk specific gravity. Further, bubbles having an extremely small particle diameter do not greatly contribute to the water-absorption rate either. Therefore, the smallest particle diameter of the bubbles is preferably not less than 50 nm, more preferably not less than 100 nm. Hence, the micro bubbles or nano bubbles have a particle diameter of preferably not less than 50 nm but not more than 100 μm, more preferably not less than 50 nm but not more than 50 μm, yet more preferably not less than 50 nm but not more than 20 μm, most preferably not less than 100 nm but not more than 5 μm.

The size of bubbles is measured by (a) laser diffraction scattering method (another name: static light scattering method), (b) dynamic light scattering method, (c) electric sensing zone method (ordinary name: Coulter counter method), (d) particle counting method (light scattering or light shielding), (e) visibility method by shooting with camera, (f) interferometric imaging by use of a laser beam and a CCD camera or like method.

The number of bubbles can be counted by (c) electric sensing zone method or (d) particle counting method. Nano order is measured by (b) dynamic light scattering method or (a) laser diffraction scattering method (another name: static light scattering method). The above-described methods are employed as appropriate. Preferably, the light scattering method, particularly the dynamic light scattering method is employed.

(2-3) Polymerization Step

A polymerization step is a step for polymerizing a monomer solution. According to the methods (I) to (III), the monomer solution containing the bubbles is polymerized in the absence of a surface active agent or in the presence of not more than 300 ppm of a surface active agent. In the method (IV), a preferable amount of the surface active agent to be employed is not more than 30 ppm. The polymerization is carried out under normal pressure, reduced pressure, or increased pressure, preferably under normal pressure (or under a pressure in the vicinity of normal pressure, generally a pressure increased or reduced by 10 mmHg from normal pressure).

(Polymerization Initiator)

A polymerization initiator employed in the present step is not particularly limited. At least one kind of polymerization initiators normally employed for producing water-absorbent resin powder is selected for use in accordance with types of a monomer to be polymerized, a polymerization condition or the like.

Examples of the polymerization initiator encompass: a thermally decomposable initiator (for example, (i) persulfate such as sodium persulfate, potassium persulfate or ammonium persulfate, (ii) peroxide such as hydrogen peroxide, t-butyl peroxide or methyl ethyl ketone peroxide, (iii) an azo compound such as an azonitrile compound, an azoamidine compound, a cyclic azoamidine compound, an azoamido compound, an alkylazo compound, 2,2'-azobis(2-amidinopropane)dihydro chloride, or 2,2'-azobis[2-(2-imidazoline-2-yl)propane]dihydrochloride); and an optically decomposable initiator (for example, benzoin derivatives, benzyl derivatives, acetophenone derivatives, benzophenone derivatives, or an azo compound). Among these, in consideration of low cost and capability of lowering a residual monomer amount, it is preferable to employ a thermally decomposable initiator, particularly preferable to employ persulfate.

Further, employing a reducing agent in combination with the polymerization initiator makes it possible to promote decomposition of the polymerization initiator. Therefore, a redox initiator that functions as a reducing agent and a polymerization initiator can be employed. The reducing agent is not particularly limited. Examples of the reducing agent encompass: (bi)sulfite and a salt thereof such as sodium sulfite or sodium hydrogen sulfite; L-ascorbate and a salt thereof; a reducing metal and a salt thereof such as ferrous salt; and amines. In a case where an oxidizing polymerization initiator and the reducing agent are employed as a redox initiator, the oxidizing polymerization initiator and the reducing agent can be individually mixed with the monomer solution by means of the method of the present invention. Alternatively, the reducing agent can be mixed with the monomer solution in advance.

(Hydrophilic Macromolecule or the Like)

In a case where the polymerization is carried out, a hydrophilic macromolecule (for example, starch, starch derivatives, cellulose, cellulose derivatives, polyvinyl alcohol, polyacrylic acid (polyacrylate) or crosslinked polyacrylic acid (polyacrylate)), a chain transfer agent (for example, hypophosphorous acid (hypophosphite)), or a chelating agent may be further added as appropriate to a reaction system that is not polymerized or in the course of the polymerization. A water-soluble resin or a water-absorbent resin is suitably employed as the hydrophilic macromolecule. The water-soluble resin or the water-absorbent resin improves viscosity of the reaction system, and serves as a boiling stone for generating bubbles. This promotes generation of the bubbles. An amount of hydrophilic macromolecule to be employed for 100 parts by weight of the monomer is preferably more than 0 part by weight but not more than 50 parts by weight, more preferably not less than 0.01 part by weight but not more than 20 parts by weight.

(Polymerization Technique)

A polymerization technique of the present polymerization step is not particularly limited. A normal polymerization technique employed for producing water-absorbent resin powder can be employed. Examples of the polymerization technique encompass an aqueous polymerization method and a reverse phase suspension polymerization method. The aqueous polymerization method includes, for example, a static polymerization method for statically polymerizing a monomer solution, and a stirring polymerization method for polymerizing in a stirring device. Each of the static polymerization method and the stirring polymerization method is further classified into a batch method and a continuous method. Furthermore, the static polymerization method and the stirring polymerization method are normally carried out by use of a belt polymerization device or a stirring polymerization device, respectively.

A device for producing the water-absorbent resin powder of the present invention is not particularly limited as long as the device for producing the water-absorbent resin powder of the present invention can continuously polymerize the monomer solution continuously supplied by the above-described method. Meanwhile, the device for producing the water-absorbent resin powder of the present invention is preferably a belt-type continuous polymerization device or a continuous stirring polymerization device.

A technique disclosed in Japanese Patent Application Publication, Tokukai No. 2000-034305, Japanese Patent Application Publication, Tokukaihei No. 11-228604, Japanese Patent Application Publication, Tokukaisho No. 62-156102 or the like is applicable to the belt-type continuous polymerization device. Specifically, a high temperature and concentration polymerization technique disclosed in Japanese Patent Application Publication, Tokukai No. 2002-212204 can be applicable to the belt-type continuous polymerization device.

A preferable polymerization device is an endless belt-type continuous polymerization device including a belt made of fluorocarbon resin or a belt whose surface is coated with fluorocarbon resin. A more preferable polymerization device is further provided with a heater or a heat insulating device, and has a system for collecting and reusing steam of water and/or a monomer solution generated during the polymerization. Further, it is preferable that the belt is provided horizontally to a monomer mixed liquid supply section or at a position higher than that where the monomer mixed liquid supply section is positioned so as to prevent backflow of the monomer mixed liquid. Furthermore, it is preferable that belt cleaning means is provided in the course where a polymerization gel discharged from the belt reaches an opening of the monomer mixed liquid supply section.

Further, examples of the continuous stirring polymerization device encompass a stirring device having a single shaft, and a stirring device having a plurality of stirring shafts such as a continuous kneader. In a case where productivity is taken into consideration, the stirring device having a plurality of stirring shafts is preferably employed.

A polymerization temperature of the polymerization is not particularly limited. Meanwhile, it is preferable that the polymerization temperature is generally in the range of not less than 10° C. but not more than 140° C. The polymerization carried out at a temperature of less than 10° C. possibly causes not only deterioration in productivity due to increase in polymerization time period but also deterioration in the physical property of the water-absorbent resin powder. The polymerization carried out at a temperature of more than 140° C. that is highest temperature (peak temperature) during the polymerization also possibly causes deterioration in the physical property of the water-absorbent resin powder. Further, the polymerization time period is not particularly limited either, and may be determined as appropriate in accordance with types of the monomer and the polymerization initiator, the polymerization temperature or the like. Further, the above-described polymerization is generally carried out under normal pressure in consideration of simplicity of a device and easy operation of the device. Meanwhile, it is also preferable that the polymerization is carried out under reduced pressure so that a boiling temperature of a polymerization system is lowered.

In a case where the belt-type continuous polymerization is carried out, a belt-like shaped polymerized gel of the water-absorbent resin powder is continuously produced. The polymerized gel thus produced can be used as it is. Alternatively, the polymerized gel can be finely crushed before it is used. Generally, the polymerized gel is further dried and crushed so as to be made into the water-absorbent resin powder. The resultant water-absorbent resin powder is further surface-crosslinked, or granulated for use as a water-absorbent resin product. In order to crush, dry and surface-crosslink the polymerized gel, a conventionally well-known technique can be employed.

(Particularly Suitable Foam Polymerization Condition)

The above-described polymerization technique (the aqueous polymerization or the reverse phase suspension polymerization) can be broadly employed. Meanwhile, the polymerization particularly suitable for attaining the object of the present invention is the aqueous polymerization, particularly the belt-type continuous polymerization or the continuous kneader polymerization. The aqueous polymerization is preferably carried out at the following temperature and concentration. That is, the present invention further found that it is significant to carry out the foam polymerization at specific concentration and temperature though the foam polymerization disclosed in Patent Literatures 7 to 29 is already known.

It is preferable to start the polymerization at a high temperature in order to promote foaming during the polymerization and defoaming prior to the polymerization. Specifically, it is preferable to start the polymerization in the polymerization step at not less than 40° C., more preferably at not less than 50° C., yet more preferably at not less than 60° C., further more preferably at not less than 70° C., most preferably at not less than 80° C. Meanwhile, an extremely high temperature at which the polymerization is started possibly causes deterioration in water-absorbency or solubility. Therefore, an upper limit of the temperature at which the polymerization is started should be not more than a boiling point of the monomer solution, particularly not more than 100° C., more preferably not more than 95° C. Generally, a solubility of gas is deteriorated as a temperature increases. Therefore, it is also preferable to disperse the bubbles dissolved in the monomer solution by increasing the temperature at which the polymerization is started or a maximum temperature reached during the polymerization.

Further, it is preferable that the maximum temperature reached during the polymerization is high in order to promote the foaming. Specifically, the maximum temperature during the polymerization in the polymerization step is preferably not less than 100° C., more preferably not less than 100° C. but not more than 150° C., yet more preferably not less than 100° C. but not more than 130° C., most preferably not less than 105° C. but not more than 120° C.

Further, it is preferable that a concentration of an acrylic monomer solution is great in the polymerization step in order to promote the foaming. Specifically, the concentration is preferably not less than 40% by weight, more preferably not less than 45% by weight, most preferably not less than 50% by weight (an upper limit of the concentration is normally not more than 90% by weight, preferably not more than 80% by weight, most preferably not more than 70% by weight). Such a solid content is applied to a hydrated gel crosslinked polymer obtained after the polymerization.

(2-4) Fragmenting Step

Such a produced hydrated gel is fragmented during or after the polymerization of the hydrated gel crosslinked polymer.

The hydrated gel is fragmented by the kneader or the reverse phase suspension polymerization during the polymerization of the hydrated gel crosslinked polymer. Meanwhile, the hydrated gel is fragmented by a meat chopper or the like after the polymerization of the hydrated gel crosslinked polymer.

If the hydrated gel is not fragmented in the method of the present invention, the objective water-absorbent resin powder of the present invention is not probably produced. Therefore, the hydrated gel is fragmented during or after the polymerization. The hydrated gel thus fragmented is dried, and preferably further surface-crosslinked as described below. A sheet-like water-absorbent resin disclosed in Patent Literatures 19 and 22 cannot attain the object of the present invention. Therefore, a water-absorbent resin that is not dried or dried is crushed into the water-absorbent resin powder. Meanwhile, Japanese Patent Application Publication Tokukai No. 2001-151804 A (organism immobilization support for wastewater treatment) neither suggests the water-absorbent resin nor discloses the polymeric powder.

(2-5) Step of Drying by Heat

The hydrated gel crosslinked polymer is dried so as to be a dried polymer in the step of drying by heat. A solid resin obtained on the basis of an amount (obtained by heating 1 g of powder or particles at 180° C. for 3 hours) of the hydrated gel crosslinked polymer which amount is reduced by drying the hydrated gel crosslinked polymer is preferably not less than 80% by weight, more preferably not less than 85% by weight but not more than 99% by weight, yet more preferably not less than 90% by weight but not more than 98% by weight, most preferably not less than 92% by weight but not more than 97% by weight. The dried polymer having such a solid resin is produced.

A drying temperature is not particularly limited, preferably in the range from 100° C. to 300° C., more preferably in the range from 150 C.° to 250 C.°. An aggregate obtained in the drying step may be supplied directly to a crushing step. Further, it is also preferable to promote the foaming during the drying by heating at the above-described temperature the hydrated gel crosslinked polymer containing the bubbles, particularly internally containing the bubbles.

(Particle Size)

The water-absorbent resin powder obtained after the step of drying by heat is prepared so as to have a weight average particle diameter (D50) of preferably 200 μm to 600 μm, more preferably 200 μm to 550 μm, yet more preferably 250 μm to 500 μm, most preferably 350 μm to 450 μm.

Further, it is preferable that the water-absorbent resin powder includes less particles having a diameter of less than 150 μm. Therefore, the particles having the diameter of less than 150 μm to be included in the water-absorbent resin powder are adjusted to normally account for 0% by weight to 5% by weight, preferably 0% by weight to 3% by weight, more preferably 0% by weight to 1% by weight. Further, it is also preferable that the water-absorbent resin powder includes less particles having a diameter of not less than 850 μm (preferably not less than 710 μm). Therefore, the particles having the diameter of not less than 850 μm to be included in the water-absorbent resin powder are adjusted to normally account for 0% by weight to 5% by weight, preferably 0% by weight to 3% by weight, more preferably 0% by weight to 1% by weight. Furthermore, it is preferable in the present invention that particles having a diameter of not less than 150 μm but less than 850 μm, preferably not less than 150 μm but less than 710 μm account for 95% by weight, preferably 98% by weight (upper limit: 100% by weight). The water-absorbent resin powder having such a weight average particle diameter is surface-crosslinked.

The particle size is measured by use of, for example, a normal sieve. This is described in International Patent Application Publication No. WO2004/69915, pamphlet, EDANA-ERT420.2-02 and the like. The particle size of the water-absorbent resin powder that is not surface-crosslinked is preferably applicable to a particle size of the water-absorbent resin powder that is surface-crosslinked, more preferably applicable to a particle size of a final product (another name: a particular water-absorbent agent).

(2-6) Surface Crosslinking Step

The production method of the present invention may further include a step of superficially processing the water-absorbent resin powder thus produced.

(Crosslinking Agent)

The production method of the present invention further including a surface crosslinking step following the step of drying by heat is applicable to a method for producing water-absorbent resin powder having excellent water-absorption ratio under pressure (AAP) and liquid permeability (SFC), or continuous large-scale production (particularly 1 t/hr), particularly suitably applicable to water-absorbent resin powder to be surface-crosslinked at a high temperature.

In the surface crosslinking step, a covalent surface crosslinking agent is employed. Preferably, the covalent surface crosslinking agent and an ionically-crosslinking surface crosslinking agent are used in combination.

(Covalent Surface Crosslinking Agent)

Examples of the surface crosslinking agent to be employed in the surface crosslinking step encompass various organic or inorganic crosslinking agents. Among others, the organic crosslinking agents are preferably employed. Further, in a case where a physical property of the surface crosslinking agent is taken into consideration, a polyhydric alcohol compound, an epoxy compound, a polyvalent amine compound, a condensation product of the polyvalent amine compound with a haloepoxy compound, an oxazoline compound, a (mono-, di-, or poly-)oxazolidinone compound, an alkylene carbonate compound or the like can be employed as the surface crosslinking agent of the present invention. Particularly, a dehydration reactive crosslinking agent comprising a polyhydric alcohol compound, an alkylene carbonate compound or an oxazolidinone compound that requires a high temperature for reaction is preferably employed.

No use of the dehydration reactive crosslinking agent possibly causes AAP not to be easily improved under a high pressure (for example, 4.83 kPa). More specifically, the surface crosslinking agent that can be used in this step is a compound described in U.S. Pat. No. 6,228,930, U.S. Pat. No. 6,071,976, U.S. Pat. No. 6,254,990, or the like. Examples of such a compound encompass a polyhydric alcohol compound (for example, monopropylene glycol, dipropylene glycol, tripropylene glycol, tetrapropylene glycol, 1,3-propanediol, glycerine, 1,4-butanediol, 1,3-butanediol, 1,5-pentanediol, 1,6-hexanediol, or sorbitol), an epoxy compound (for example, ethylene glycol diglycidyl ether or glycidol), an alkylene carbonate compound (for example, ethylene carbonate), an oxetane compound, and a cyclic urea compound (for example, 2-imidazolidinone).

(Ionically-Bonded Surface Crosslinking Agent)

Further, other than the organic surface crosslinking agents, a polyamine polymer or polyvalent metal salt can be employed as an ionically-bonded surface crosslinking agent so as to improve the liquid permeability or the like. The polyvalent metal salt (inorganic surface crosslinking agent) to be employed is polyvalent metal salt having not less than two valences, preferably trivalent or tetravalent metal salt (organic salt or inorganic salt), or a hydroxide. Further, examples of a polyvalent metal to be employed encompass aluminum and zirconium, more specifically aluminum lactate or aluminum sulfate.

(Solvent)

An amount of the surface crosslinking agent to be employed for 100 parts by weight of the water-absorbent resin powder is determined as appropriate in the range of 0.001 part by weight to 10 parts by weight, preferably 0.01 part by weight to 5 parts by weight. Further, water can be preferably used in combination with the surface crosslinking agent. In this case, a small amount of hydrophilic organic solvent can be also used in combination with the water if necessary. Specifically, preferably not more than 100% by weight, more preferably not more than 50% by weight of the hydrophilic organic solvent can be used for 100% by weight of water. Examples of the hydrophilic organic solvent encompass various lower alcohols, ethylene oxide adducts thereof that are described in the above-described United States Patent or the like. However, the hydrophilic organic solvent to be employed is not particularly limited.

An amount of water to be used for 100 parts by weight of the water-absorbent resin powder accounts for preferably 0.5 part by weight to 20 parts by weight, more preferably 0.5 part by weight to 10 parts by weight. Further, in a case where an inorganic crosslinking agent and an organic crosslinking agent are used in combination, amounts of the inorganic crosslinking agent and the organic crosslinking agent to be used for 100 parts by weight of the water-absorbent resin powder individually account for 0.001 part by weight to 10 parts by weight, preferably 0.01 part by weight to 5 parts by weight. In this case, the hydrophilic organic solvent can be also employed if necessary. An amount of the hydrophilic organic solvent to be employed for 100 parts by weight of the water-absorbent resin powder accounts for more than 0 part by weight but not more than 10 parts by weight, preferably more than 0 part by weight but not more than 5 parts by weight.

Further, in a case where the crosslinking solution is mixed with the water-absorbent resin powder, water-insoluble fine particle powder or a surface active agent can be also mixed with the mixture of the crosslinking solution with the water-absorbent resin powder as long as the water-insoluble fine particle powder or the surface active agent does not deteriorate the effect of the present invention. Specifically, amounts of the water-insoluble fine particle powder or the surface active agent to be employed is not more than 10 parts by weight, preferably more than 0 part by weight but not more than 5 parts by weight, more preferably more than 0 part by weight but not more than 1 part by weight. Which and how much surface active agent to be employed are described in U.S. Pat. No. 7,473,739, or the like.

The water-absorbent resin powder with which the surface crosslinking agent is mixed is heated, and then cooled is necessary. The water-absorbent resin powder is heated at a temperature of 70° C. to 300° C., preferably 120 C.° to 250° C., more preferably 150° C. to 250° C. Further, the water-absorbent resin powder is heated for preferably 1 minute to 2 hours.

Such surface crosslinking causes water-absorption ratio under pressure (AAP) to reach the following range, preferably not less than 20 [g/g], more preferably 23 [g/g] to [g/g] while causing deterioration in water-absorption ratio under no pressure (CRC).

(2-7) Other Steps

The method of the present invention can include as appropriate a second sieving step, a vaporized monomer recycling step, a granulating step, a fine powder removing step, a fine powder recycling step and/or like steps, other than the above-described steps. Further, the following additive can be added to the monomer or a polymer thereof so as to attain a stability of a color that changes over time, prevention of deterioration in gel, or the like.

Further, more than 0% by weight but not more than 3% by weight, preferably more than 0% by weight but not more than 1% by weight of an oxidizing agent, an anti-oxidizing agent, a reducing agent, a chelate agent, a coloring inhibitor, water, a polyvalent metal compound, water-insoluble inorganic powder or water-insoluble organic powder such as silica or metal soup, a deodorant, an antibacterial agent, pulp, thermoplastic fiber or the like can be added to the water-absorbent resin powder as appropriate. The above describes the amount of the surface active agent to be preferably used in the water-absorbent resin powder.

According to the above-described production method (in other words, the first to fifth production methods described in "Solution to Problem"), it is possible to produce polyacrylic water-absorbent resin powder having an water-absorbency index of not less than 90 and a bulk specific gravity of 0.6 [g/cm$^3$] to 0.8 [g/cm$^3$], the water-absorbency index being obtained by the following formula where (Water-absorbency index)=(FSR [g/g/sec])×(bulk specific gravity [g/cm$^3$])×(weight average particle diameter [μm]).

The polyacrylic water-absorbent resin powder thus produced can be further surface-crosslinked. Namely, the water-absorbent resin powder production method of the present invention may include a method for surface-crosslinking the polyacrylic water-absorbent resin powder having the water-absorbency index of not less than 90 obtained by the above formula and the bulk specific gravity of 0.6 [g/cm$^3$] to 0.8 [g/cm$^3$].

That is, the present invention provides: a water-absorbent resin having a water-absorbency index of not less than 90; and the first to sixth production methods described in "Solution to Problem" as the method for producing the water-absorbent resin having the water-absorbency index of not less than 90.

(3) PHYSICAL PROPERTY OF POLYACRYLIC WATER-ABSORBENT RESIN POWDER

The polyacrylic water-absorbent resin powder of the present invention has a water-absorbency index of not less than 90 and a bulk specific gravity of 0.6 [g/cm$^3$] to 0.8 [g/cm$^3$]. The water-absorbency index is obtained by the following formula where (Water-absorbency index)=(FSR [g/g/sec])×(bulk specific gravity [g/cm$^3$])×(weight average particle diameter [μm]).

The production method (in other words, the first to fifth production methods described in "Solution to Problem") of the present invention is suitably applicable to the following water-absorbent resin powder production method, preferably applicable to control and improvement of liquid permeability (SFC) or water-absorption rate (FSR). Note that the following physical property and physical properties of Examples are measured by EDNA method if not otherwise specified.

The polyacrylic water-absorbent resin powder has a more excellent water-absorbency as the water-absorbency index becomes 90, 95, 100, 105, 110, 115 and 120 in this ascending order. An upper limit of the water-absorbency index is 150. Further, the polyacrylic water-absorbent resin powder has a sufficiently excellent water-absorbency in a case where the water-absorbency index is 140. Such novel water-absorbent resin powder has an excellent liquid permeability or impact resistance thereby being suitably applicable to absorbent products such as disposable diapers. Meanwhile, water-absorbent resin powder having a small or extremely great water-absorbency index is possibly unsuitable for practical use.

A method for improving tolerance to damage (impact resistance) of a water-absorbent resin is described in Patent Literature 32 (application of specific surface crosslinking), Patent Literature 30 (surface polish), Patent Literatures 29 and 34 (addition of water after surface crosslinking), Patent Literature 33 (usage of a specific internal crosslinking agent) or the like, all of which are described in Background Art. However, these Patent Literatures do not describe the foam polymerization. According to the present invention, the water-absorption rate is improved by means of the foam polymerization, and the water-absorbent resin having an excellent tolerance to damage (less deterioration in the physical property due to damage) is produced by means of a technique different from those described in these Patent Literatures.

That is, the present invention can provide a water-absorbent resin excellent in both properties that are difficult to be simultaneously attained, namely, both the water-absorption rate (for example, FSR) and the tolerance to damage (for example, the testing method of the above Patent Literature), or both the water-absorption rate (for example, FSR) and the liquid permeability (for example, SFC). In order to provide the water-absorbent resin having both the physical properties contradictory to each other, the water-absorbent resin whose water-absorbency index is controlled is surface-crosslinked. The water-absorbency index does not substantially change before and after the surface crosslinking.

The water-absorbent resin powder is foamed (another name: porous). The porosity can be recognized by seeing an electron micrograph of a particle surface of the water-absorbent resin powder. The particle surface has pores having an average diameter of preferably not more than 100 μm, more preferably 0.1 μm to 90 μm, most preferably 1 μm to 50 μm. The water-absorbent resin powder mainly contains porous particles.

In a case where the water-absorbent resin powder is employed for a sanitary material, particularly for disposable diapers, it is preferable that at least one of, preferably not less than two including AAP of, most preferably not less than three of the following (3-1) to (3-7) are controlled by the polymerization or the surface crosslinking. Water-absorbent resin powder that does not meet the following requirements does not possibly yield an effect suitable for the following highly-concentrated diaper. The water-absorbent resin powder of the present invention can include preferably not more than 0.03% by weight, more preferably not more than 0.003% by weight of a surface active agent for 100% by weight of the water-absorbent resin powder. Alternatively, the water-absorbent resin powder of the present invention includes no surface active agent.

(3-1) AAP (Water-Absorption Ratio Under Pressure)

A water-absorption ratio (AAP) for absorbing 0.9% by weight of sodium chloride solution under pressure of 1.9 kPa, preferably 4.8 kPa is controlled to be preferably not less than 20 [g/g], more preferably not less than 22 [g/g], yet more preferably not less than 24 [g/g] by, for example, the polymerization and further the surface crosslinking, so that leak from a disposable diaper is prevented. It is preferable that AAP is great, and an upper limit of AAP is not particularly limited. However, in consideration of balance with another physical property, the upper limit of AAP is normally not more than 40 [g/g], preferably not more than 35 [g/g], more preferably not more than 30 [g/g].

(3-2) CRC (Water-Absorption Ratio Under No Pressure)

A water-absorption ratio under no pressure (CRC) is controlled to be preferably not less than 10 [g/g], more preferably not less than 20 [g/g], yet more preferably not less than 25 [g/g], most preferably not less than 30 [g/g]. It is preferable that CRC is great, and an upper limit of CRC is not particularly limited. However, in consideration of balance with another physical property, the upper limit of CRC is preferably not more than 50 [g/g], more preferably not more than 45 [g/g], yet more preferably not more than 40 [g/g].

(3-3) SFC (Saline Flow Conductivity)

0.69 wt % Saline Flow Conductivity (SFC) that is a liquid permeability of a liquid under pressure is controlled to be not less than 1 [$\times 10^{-7} \cdot cm^3 \cdot s \cdot g^{-1}$], preferably not less than 20 [$\times 10^{-7} \cdot cm^3 \cdot s \cdot g^{-1}$], more preferably not less than 50 [$\times 10^{-7} \cdot cm^3 \cdot s \cdot g^{-1}$], yet more preferably not less than 70 [$\times 10^{-7} \cdot cm^3 \cdot s \cdot g^{-1}$], most preferably not less than 100 [$\times 10^{-7} \cdot cm^3 \cdot s \cdot g^{-1}$] by, for example, the polymerization, so that leak from disposable diapers is prevented. SFC is obtained by a conventional measurement method, for example, a method described in U.S. Pat. No. 5,562,646.

Generally, a water-absorption rate is adversely proportional to a liquid permeability. Meanwhile, the present invention allows improving the liquid permeability, particularly improving SFC, more preferably attaining SFC having a value in the above-described range while maintaining or improving the water-absorption rate. Particularly, in a case where SFC is not less than 20 [$\times 10^{-7} \cdot cm^3 \cdot s \cdot g^{-1}$], the present invention yields an excellent effect. Therefore, the present invention is suitably applicable to a method for producing the water-absorbent resin powder having such an excellent liquid permeability.

(3-4) Ext (Water-Soluble Content)

Water-soluble content is preferably more than 0 but not more than 35% by weight, more preferably not more than 25% by weight, yet more preferably not more than 15% by weight, most preferably not more than 10% by weight.

(3-5) FSR (Water-Absorption Rate)

Water-absorption rate (FSR) of 1 g of the water-absorption resin powder for absorbing 20 g of physiological saline is normally not less than 0.05 [g/g/sec], preferably not less than 0.1 [g/g/sec], more preferably not less than 0.15 [g/g/sec], yet more preferably not less than 0.20 [g/g/sec], most preferably not less than 0.25 [g/g/sec].

Increase in the water-absorption rate (FSR) possibly deteriorates another physical property such as liquid permeability. Specifically, an extremely great water-absorption rate of a disposable diaper possibly deteriorates diffusivity thereof. Therefore, an upper limit of FSR is preferably 0.1 [g/g/sec], more preferably 0.50 [g/g/sec].

FSR is measured by a method described in International Patent Application Publication No. WO2009/016055, pamphlet. For example, in a case where FSR of a water-absorbent resin having a CRC of less than 20 (g/g) is measured, physiological saline (absolute quantity) to be employed is adjusted in accordance with the CRC. Normally, FSR of a water-absorbent resin having a CRC of not less than 20 g/g, preferably not less than 25 g/g is measured.

(3-6) Bulk Specific Gravity

Bulk specific gravity of the water-absorbent resin powder is normally 0.6 [g/cm$^3$] to 0.8 [g/cm$^3$], preferably 0.61 [g/cm$^3$] to 0.75 [g/cm$^3$], more preferably 0.63 [g/cm$^3$] to 0.70 [g/cm$^3$]. The water-absorbent resin powder of the present invention is foamed (in other word, porous) while having a more excellent bulk specific gravity than that of a conventional water-absorbent resin powder. Therefore, the water-absorbent resin powder of the present invention makes it possible to realize a compact and thin diaper. Further, the water-absorbent resin powder of the present invention also allows not only low cost transfer due to small volume (volume in a bag) of the water-absorbent resin powder but also achievement of an excellent impact resistance of the powder and maintenance of an excellent physical property of the powder.

(3-7) Surface Tension

Surface tension (defined by a measurement method of Examples) is preferably not less than 60 [mN/m], more preferably not less than 65 [mN/m], yet more preferably not less than 67 [mN/m], particularly preferably not less than [mN/m], most preferably not less than 72 [mN/m]. Further, the surface tension is not substantially deteriorated. An upper limit of the surface tension is normally 75 [mN/m], which can yield a sufficient effect.

(4) APPLICATION OF POLYACRYLIC WATER-ABSORBENT RESIN POWDER

Application of the polyacrylic water-absorbent resin powder of the present invention is not particularly limited. Preferably, the polyacrylic water-absorbent resin powder of the present invention can be employed for an absorbent product such as a disposable diaper, a sanitary napkin or an incontinence pad. In a case where the absorbent product includes an absorber that optionally includes another absorbent material (such as a pulp fiber) other than the water-absorbent resin powder of the present invention, amount of water-absorbent resin powder to be included in the absorber (core concentration) is 30% by weight to 100% by weight, preferably 40% by weight to 100% by weight, more preferably 50% by weight to 100% by weight, yet more preferably 60% by weight to 100% by weight, particularly preferably 70% by weight to 100% by weight, most preferably 75% by weight to 95% by weight. In this case, the effect of the present invention is yielded. As described above, the water-absorbent resin powder of the present invention has excellent water-absorption rate, liquid permeability and bulk specific gravity. Use of such water-absorbent resin powder makes it possible to provide a compact and thin diaper.

[5] EXAMPLES

The following describes the present invention according to Examples. However, the present invention should not be narrowly interpreted within the limits of such Examples. Further, physical properties described in Claims and Examples of the present invention were obtained on the basis of the following measurement examples 1 to 9. In Examples, the following measurement method measures a particulate water-absorbent agent. Meanwhile, water-absorbent resin powder can be substituted for the particulate water-absorbent agent. Therefore, the following measurement method can measure the water-absorbent resin powder. Further, a polymerization step and a defoaming step were carried out under normal pressure if not otherwise specified. Furthermore, steps following a crushing step were also carried out under normal pressure (or under a pressure slightly reduced from normal pressure, for example, a pressure reduced by not more than 10 mmHg).

Measurement Example 1

Weight Average Particle Diameter (D50), and Logarithmic Standard Deviation ($\sigma\zeta$) of Particle Size Distribution A particulate water-absorbent agent was sieved by use of a sieve having an opening size of 850 μm, 710 μm, 600 μm, 500 μm, 425 μm, 300 μm, 212 μm, 150 μm, or 45 μm, the sieve being established by JIS. Residual weight percentage R was plotted on a logarithmic probability paper. From the logarithmic probability paper, a particle diameter whose R was 50% by weight was read out as a weight average particle diameter (D50). Further, a logarithmic standard deviation ($\sigma\zeta$) of particle size distribution was calculated by Formula 1. The particle size distribution becomes narrower as a $\sigma\zeta$ value gets smaller.

[Math. 1]

$$\sigma\zeta = 0.5 \times \ln(X2/X1) \qquad \text{Formula 1}$$

where X1 represents a particle diameter whose R is 84.1%, and X2 represents a particle diameter whose R is 15.9%.

A particulate water-absorbent agent was sieved at a room temperature of (23±2° C.) and a humidity of 50 RH % in order to measure a weight average particle diameter (D50) and a logarithmic standard deviation ($\sigma\zeta$) of particle size distribution of the particulate water-absorbent agent as follows. Firstly, 10.0 g of particulate water-absorbent agent was supplied into a JIS established sieve (THE IIDA TESTING SIEVE: 8 cm in diameter) having an opening of 850 μm, 710 μm, 600 μm, 500 μm, 425 μm, 300 μm, 212 μm, 150 μm, or 45 μm, and sieved for 5 minutes by use of a vibration classifier (IIDA SIEVE SHAKER, TYPE: ES-65 (rotation frequency: 60 Hz 230 rpm, impact frequency: 60 Hz 130 rpm), SER. No 0.0501).

Measurement Example 2

CRC (Water-Absorption Ratio Under No Pressure)

CRC (water-absorption ratio under no pressure) indicates a water-absorption ratio obtained by absorbing 0.90% by weight of sodium chloride (referred to as physiological saline) for 30 minutes under no pressure. CRC can be referred to as Centrifuge Retention Capacity.

Specifically, 0.2 g of particulate water-absorbent agent was evenly put in a bag (60 mm×85 mm) made of a nonwoven material (manufactured by Nankoku Pulp Industry, name of commodity: heatron paper, type: GSP-22), sealed by heat, and soaked in a largely excessive amount (normally substantially 500 ml) of 0.90% by weight of sodium chloride solution (physiological saline) having a temperature of 23(±2)° C. for 30 minutes. Thereafter, the bag was taken out from the sodium chloride solution, centrifuged at a centrifugal force of 250 G for 3 minutes by use of a centrifuge (manufactured by KOKUSAN Co., Ltd., centrifuge: H-122). Thereafter, a weight W1 [g] of the bag was measured. Meanwhile, the above-described operation was carried out without employing the particulate water-absorbent agent, and a weight W2 [g] was measured. In this manner, CRC (water-absorption ratio under no pressure) [g/g] was calculated by Formula 2.

[Math. 2]

$$\text{CRC [g/g]} = (W1-W2)/0.2 - 1 \qquad \text{Formula 2}$$

Measurement Example 3

Solid Content

Solid content indicates a percentage of a component of the particle water-absorbent agent which component does not vaporize at 180° C. The following describes a relationship of the solid content with water content.

Solid content [% by weight]=100−water content [% by weight]

Solid content was measured as follows.

Approximately 1 g of particulate water-absorbent agent (weight W4 [g]) was put in an aluminum cup (weight W3 [g]) having a bottom surface having a diameter of substantially 5 cm, and dried by being allowed to stand for 3 hours in a windless dryer of 180° C. Thereafter, a total weight (W5 [g]) of the dried particulate water-absorbent agent and the aluminum cup was measured. In this manner, the solid content of the particulate water-absorbent agent was calculated by Formula 3.

[Math. 3]

$$\text{Solid content [\% by weight]} = \{(W5-W3)/W4\} \times 100 \qquad \text{Formula 3}$$

Measurement Example 4

FSR (Water-Absorption Rate)

In a 25 ml of glass beaker (having a diameter of 32 mm to 34 mm and a height of 50 mm), 1.00 g of particulate water-absorbent agent was placed such that an upper level of the particulate water-absorbent agent is leveled off (the upper level of the particulate water-absorbent agent may be leveled off as appropriate by, for example, carefully patting the glass beaker). Thereafter, 20 g of 0.90% by weight of sodium chloride solution adjusted to 23° C.±0.2° C. was weighed in a 50 ml of glass beaker. Subsequently, a total weight (weight W6 [g]) of the sodium chloride solution and the glass beaker was measured. Thereafter, the sodium chloride solution was quickly poured into the 25 ml of glass beaker in which the particulate water-absorbent agent was put.

A time period measurement was started immediately after the sodium chloride solution contacted with the particulate water-absorbent agent by being poured into the ml of glass beaker. The time period measurement (time period $t_s$ [second]) was stopped at a point of time when it was observed that an upper level of the sodium chloride solution was replaced with a level of the particulate water-absorbent agent that absorbed the sodium chloride solution. The observation was carried out by viewing the upper level of the sodium chloride solution poured into the 25 ml of glass beaker at an angle of substantially 20° to the upper level of the sodium chloride solution. After the time period measurement, a weight (weight W7 [g]) of the 50 ml of glass beaker from which the sodium chloride solution was poured out was measured. A weight (weight W8 [g]) of the sodium chloride solution poured into the 25 ml of glass beaker was calculated by Formula 4, and then FSR of the particulate water-absorbent agent was calculated by Formula 5.

[Math. 4]

$$W8 [g]=W6-W7 \qquad \text{Formula 4}$$

[Math. 5]

$$FSR [g/g/s]=W8/(t_s \times \text{weight [g] of particulate water-absorbent agent}) \qquad \text{Formula 5}$$

Measurement Example 5

Bulk Specific Gravity

Bulk specific gravity of a particulate water-absorbent agent was measured in accordance with JIS K 3362 by use of a bulk specific gravity measurement device (manufactured by KURAMOCHI KAGAKU KIKI SEISAKUSYO). Specifically, 100.0 g of particulate water-absorbent agent sufficiently mixed such that a particle size of the particulate water-absorbent agent is not unevenly distributed was put in a funnel whose damper was closed. Thereafter, the damper was quickly opened, and the particulate water-absorbent agent was accordingly dropped into a 100 ml of vessel (weight W9 [g]). The particulate water-absorbent agent that rose from the vessel was wiped off by use of a glass rod. Thereafter, a weight (weight W10 [g]) of the vessel in which the particulate water-absorbent agent was put was accurately measured to 1 decimal place. In this manner, the bulk specific gravity of the particulate water-absorbent agent was calculated by Formula 6.

[Math. 6]

$$\text{Bulk specific gravity [g/ml]}=(W10-W9)/100 \qquad \text{Formula 6}$$

The above-described measurement was carried out at a temperature of 24.2° C. and at a relative humidity of 43% RH.

Measurement Example 6

Surface Tension

Firstly, 50 ml of physiological saline adjusted to 20° C. was put in a 100 ml of beaker that was sufficiently washed. A surface tension of the physiological saline was measured by use of a tensiometer (Tensiometer K11 manufactured by KRUSS). A value obtained by measuring the surface tension of the physiological saline should be within 71 [mN/m] to 75 [mN/m].

Thereafter, a sufficiently washed fluorocarbon resin rotor having a length of 25 mm, and 0.5 g of particulate water-absorbent agent were put in the beaker containing the physiological saline which was adjusted to 20° C. and whose surface tension was measured. Thereafter, the physiological saline and the particle water-absorbent agent were stirred at 500 rpm by use of the fluorocarbon resin rotor. After 4-minute stirring, the stirring was stopped. A hydrated particulate water-absorbent agent was sedimented in the beaker, and then a surface tension of an upper liquid in the beaker was measured by use of the tensiometer. In this Example of the present invention, the surface tension was measured by a plate method employing a platinum plate. Note that the platinum plate was sufficiently washed with deionized water and further thermally washed by use of a gas burner before it was used.

Measurement Example 7

Liquid Permeability (SFC)

SFC was measured by a conventionally well-known measurement method, specifically a method described in U.S. Pat. No. 5,562,646.

Measurement Example 8

Water-Absorption Ratio Under Pressure (AAP)

A stainless wire gauze (opening: 38 μm) having a size of 400 mesh was adhered to a bottom of a plastic support cylinder having an inner diameter of 60 mm. Such a plastic support cylinder was prepared. Thereafter, 0.900 g of water-absorbent resin was evenly scattered over the stainless wire gauze at a room temperature of (25° C.±2° C.) and a humidity of 50 RH %. Subsequently, a piston and a weight were placed in this order on the scattered water-absorbent resin. The piston was arranged such that the piston had an outer diameter slightly less than 60 mm, there was no space between the piston and an inner wall surface of the support cylinder, and upward and downward action of the piston was not prevented. Further, the weight was arranged so as to evenly apply a load of 4.83 kPa to the water-absorbent resin. A total weight Wa (g) of such a set of measurement device was measured.

Thereafter, a glass filter (manufactured by SOGO LABORATORY GLASS WORKS CO., LTD., pore diameter: 100 μm to 120 μm) having a diameter of 90 mm and a thickness of 5 mm was placed in a Petri dish having a diameter of 150 mm. Thereafter, 0.9% by weight of sodium chloride solution (physiological saline) (adjusted to 20° C. to 25° C.) was added to the Petri dish so as to be leveled off with an upper level of the glass filter. Thereafter, a filter paper (manufactured by Advantec Toyo Kaisha Ltd., name of commodity: JIS P 3801, No. 2, thickness: 0.26 mm, retainable particle diameter: 5 μm) having a diameter of 90 mm was placed on the glass filter such that the whole filter paper got wet by absorbing surplus liquid.

Thereafter, the set of measurement device was placed on the moistened filter paper so that the physiological saline was absorbed into the water-absorbent resin for a predetermined time period under pressure. Note that in a case where an upper level of the physiological saline was lowered than the upper level of the glass filter, physiological saline was added such that the upper level of the physiological saline was constantly leveled off with the upper level of the glass filter. When an hour passed from absorbing the physiological saline into the water-absorbent resin, the set of measurement device was taken out from the filter paper, and a weight Wb (g) of the set of measurement device was measured. Note that the set of measurement device should be measured as quickly as possible so as not to be shaken. Subsequently, AAP was calculated by Formula 7 on the basis of the obtained weights Wa and Wb.

[Math. 7]

$$AAP\ [g/g]=(Wb-Wa)/(\text{weight of water-absorbent resin}) \quad \text{Formula 7}$$

Measurement Example 9

Calculation of Stirring Reynolds Number Re

Conventionally, stirring Reynolds number Re represents how a fluid flows, the fluid being stirred in a stirring device provided with a vessel (stirring tank) for storing the liquid and a stirring blade, as disclosed in Japanese Patent Application Publication Tokukai No. 2001-151804 A (organism immobilization support for wastewater treatment) or the like. Meanwhile, stirring Reynolds number Re in accordance with the present invention was calculated and estimated, with reference to U.S. Pat. No. 7,265,190 (family Japanese Patent No. 2004-155963), as schematic representation of how a monomer solution continuously flown in a tube flew in a case where the monomer solution was stirred.

Calculation Example (1)

Static Stirring (Nonmechanical Stirring)

In a case where a monomer mixture solution is stirred by use of a static mixer including an element obtained by twisting a rectangular plate n time(s) (one twist equals to half a rotation 180°) rightward or leftward, stirring Reynolds number is calculated by the following formula.

Note that u indicates an average fluid rate (m/s), $\rho$ indicates a fluid density (kg/m$^3$), $\mu$ indicates a viscosity (Pa·s), L indicates a total length of a static mixer (m), and d indicates an opening diameter (m).

[Math. 8]

$$Re=u\times 0.5\times n/L\times d^2\times \rho/\mu| \quad \text{Formula 8}$$

Calculation Example (2)

Dynamic Stirring (Mechanical Stirring)

In a case where a monomer mixture solution is stirred at n revolution(s) per second by use of a small stirring device including a stirring blade disposed in a tube of the small stirring device, stirring Reynolds number is calculated by the following formula.

Note that d indicates a diameter of a stirring blade (m), $\rho$ indicates a fluid density (kg/m$^3$), and $\mu$ indicates a viscosity (Pa·s).

[Math. 9]

$$Re=n\times d^2\times \rho/\mu| \quad \text{Formula 9}$$

Measurement Example 10

Expansivity of Monomer Solution

Expansivity was calculated on the basis of change in apparent specific gravity [g/ml] of a monomer solution. Specifically, 100 ml of monomer solution having a predetermined temperature (temperature at which the monomer solution was poured into a polymerization device), the monomer solution being to be polymerized, was poured into a 100 ml (tolerance: ±0.50 ml) of high-accuracy messcylinder (made of borosilicate glass, inner diameter: substantially 3 cm) placed on a balance capable of measuring to three decimal places. A weight (a) of the messcylinder into which the monomer solution was poured was measured by use of the balance immediately after the monomer solution was poured into the messcylinder. Meanwhile, a weight (b) of another 100 ml of high-accuracy messcylinder into which 100 ml of monomer solution containing bubbles was poured was measured by use of the balance immediately after the monomer solution was poured into the messcylinder. A weight ratio of 1 liter of monomer solution obtained by change in apparent specific gravity due to inclusion of bubbles in the monomer solution is calculated (by the following formula) as an expansivity of a foamed monomer of the monomer solution.

$$\text{Expansivity}=\text{weight}(b)/\text{weight}(a)$$

A specific gravity of the monomer solution is precisely dependent on a temperature or a composition of the monomer solution, and the specific gravity of the monomer solution is calculated as described above. For example, a specific gravity of a partially neutralized sodium acrylate solution having a concentration of 43% is approximately 1.2 [g/ml]. Further, an expansivity that changes before and after a defoaming step can also be measured. Further, in a case where a temperature of the monomer solution poured into the messcylinder is significantly lowered, the monomer solution poured into the messcylinder can be heated as appropriate.

Measurement Method 11

Turbidity

Turbidity represents how turbid a liquid is. A turbidity (in a range between white and transparent) of a monomer solution caused by inclusion of bubbles in the monomer solution was measured by use of a turbidity and chromaticity meter.

A standard turbidity solution prepared by purifying particles having a uniform kaolin turbidity was employed, the kaolin being a reference material. A standard curve was plotted by use of a kaolin turbidity standard solution manufactured by KANTO CHEMICAL CO., INC.

The turbidity is measured by means of an integrating sphere (a method for calculating a turbidity on the basis of a ratio of volume of light diffused by turbidity particles to total light volume, the diffused light volume and the total light volume being measured by use of the integration sphere).

Measurement unit: kaolin turbidity [mg/L (degree)]

A measurement device and a measurement condition (for example, the size of a cell) can be determined as appropriate within the above-described range. Meanwhile, the following describes a preferable method.

Measurement device: Coloration and turbidity meter Water Analyzer-2000 manufactured by NIPPON DENSHOKU INDUSTRIES CO., LTD.

Cell length: 10 mm (turbidity: 0 to 500), 5 mm (turbidity: not less than 500)

Example 1

Firstly, 461.5 g of acrylic acid, 4401.4 g of 37% by weight of sodium acrylate solution, 588.0 g of deionized water (ion exchange water), and 11.16 g of polyethylene glycol diacrylate (molecular weight 523) were dissolved (mixed) in a reactor being providing with a lid a stainless dual arm kneader having an internal volume of 10 L which stainless dual arm kneader was provided with two sigma-shaped blades and a jacket. In this manner, a monomer solution was prepared.

Thereafter, the monomer solution was deaerated for 20 minutes at a controlled temperature of 24.5° C. under nitrogen gas atmosphere. Then, micro bubbles of nitrogen gas were introduced as introduced gas into the monomer solution for 5 minutes under an absolute pressure of 0.25 MPa to 0.30 MPa by use of a micro bubble generator (manufactured by AURA TEC, Type: OM4-GP-040).

Thereafter, 14.2 g of 20% by weight of sodium persulfate solution, and 23.7 g of 0.1% by weight of L-ascorbic acid solution were added, with stirring, to the monomer solution into which the micro bubbles were introduced. In approximately 30 seconds after the addition, polymerization was started at a temperature of 24.7° C.

Thereafter, the polymerization was carried out at 25° C. to 95° C. while a produced hydrated gel crosslinked polymer was crushed. In 30 minutes after the start of the polymerization, the hydrated gel crosslinked polymer was taken out. The resultant hydrated gel crosslinked polymer was in such a state that it had been fragmented with a diameter of not more than substantially 10 mm.

The hydrated crosslinked polymer thus fragmented was spread over a stainless wire gauze having a mesh size of 850 μm, and dried by hot air of 180° C. for 45 minutes. The hydrated crosslinked polymer thus dried was crushed by use of a roll mill (WML type roll crusher manufactured by Inoguchi Giken Co., Ltd.), and sieved by use of a JIS established sieve having mesh sizes of 850 μm and 45 μm.

As a result, unevenly crushed water-absorbent resin powder (1) having 96% by weight of solid content, a weight average particle diameter (D50) of 453 μm, and a logarithmic standard deviation (σζ) of particle size distribution of 0.36 was obtained. Table 1 shows physical properties of the obtained water-absorbent resin powder (1).

Figure 2:
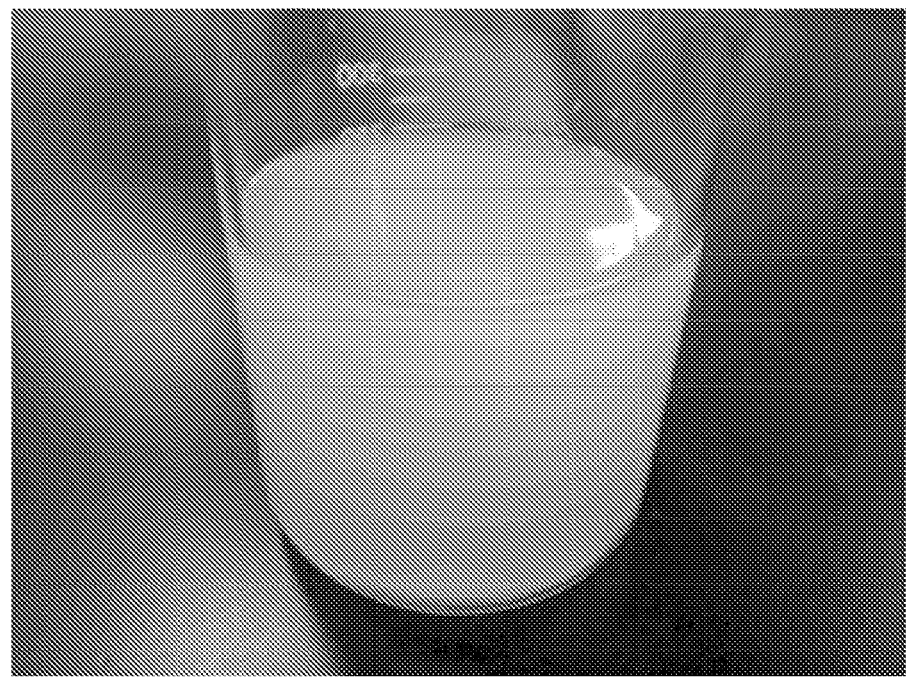
FIG. 2 is a photograph showing a state of a monomer solution in which polymerization had not yet carried out in Example 1.

FIG. 2 (photo 1) shows a state of a monomer solution in which micro bubbles were introduced but to which a sodium persulfate solution and an L-ascorbic acid solution were not yet added.

Example 2

Unevenly crushed water-absorbent resin powder (2) having 96% by weight of solid content, a weight average particle diameter (D50) of 459 μm, and a logarithmic standard deviation (σζ) of particle size distribution of 0.38 was obtained in the same manner as in Example 1 except that 0.042 g of polyoxyethylene(20)sorbitane monostearate (manufactured by Kao Corporation) was dissolved as a surface active agent in the monomer solution. Table 1 shows physical properties of the obtained water-absorbent resin powder (2).

Figure 4:
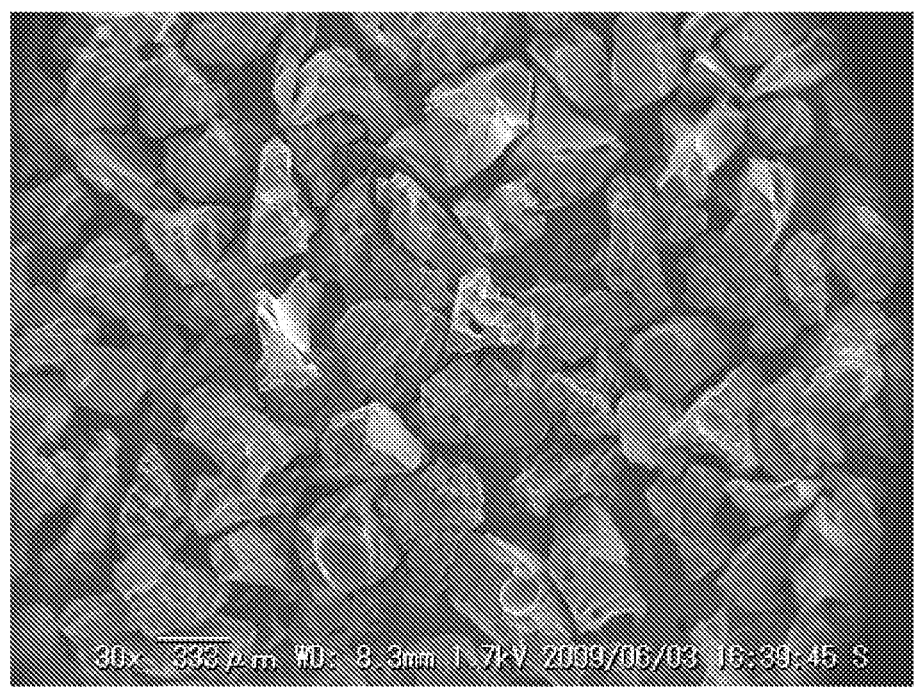
FIG. 4 is an SEM (scanning electron microscope) photograph of water-absorbent resin powder produced in Example 2.

The obtained water-absorbent resin powder (2) was sieved by use of a JIS established sieve having mesh sizes of 425 μm and 300 μm. FIG. 4 (photo 3) shows an SEM (scanning electron microscope) photograph of particles that can pass through the mesh size of 425 μm but cannot pass through the mesh size of 300 μm.

Example 3

Firstly, 421.7 g of acrylic acid, 2.754 g of polyethylene glycol diacrylate (molecular weight 523), 113.43 g of 0.1% by weight of diethylenetriaminepentaacetic acid, trisodium solution, 140.4 g of 48.5% by weight of sodium hydroxide solution, and 292.3 g of deionized water (ion exchange water) were mixed in a 1-liter polypropylene vessel so as to obtain a solution (A). Thereafter, micro bubbles of nitrogen gas were introduced as introduced gas into the solution (A) for 1 minute under an absolute pressure of 0.25 MPa to 0.30 MPa by use of a micro bubble generator (manufactured by AURA TEC, Type: OM4-GP-040), the solution (A) being adjusted to 40° C.

Thereafter, 211.9 g of 48.5% by weight of sodium hydroxide solution adjusted to 40° C. was quickly mixed with the solution (A) into which micro bubbles was introduced. In this manner, a monomer solution whose temperature was 85° C. was prepared.

The monomer solution had a kaolin turbidity of 530 [mg/L] when the temperature of the monomer solution was lowered to 82° C. Subsequently, 17.55 g of 4% by weight of sodium persulfate solution was added, with stirring, to the turbid monomer solution, and quickly poured, in the air, into a stainless vat (bottom surface: 340 mm×340 mm, height: 25 mm, internal surface: Teflon®-coated) heated to 80° C. by use of a hot plate (NEO HOTPLATE H1-1000 manufactured by IUCHISEIEIDO).

Polymerization was started immediately after the monomer solution was poured into the vat. The polymerization was carried out while causing vapor generation and radial expansion foaming. Thereafter, a hydrated polymer shrank to a volume slightly greater than that of the stainless vat. These expansion and shrinkage was stopped within 1 minute. In three minutes after the stop, the hydrated polymer (hydrated gel) was taken out of the stainless vat. Note that such a series of operation was carried out in the air.

The produced hydrated gel crosslinked polymer (hydrated gel) was crushed by use of a meat chopper (MEAT-CHOPPER TYPE: 12VR-400KSOX manufactured by IIZUKA KOGYO KABUSHIKIKAISHA, die hole diameter: 6.4 mm, number of holes: 38, die thickness: 8 mm). In this manner, the hydrated gel crosslinked polymer thus fragmented was produced. Specifically, the hydrated gel crosslinked polymer was supplied into the meat chopper at a rate of approximately 350 g/min while deionized water adjusted to 90° C. was simultaneously added into the meat chopper at a rate of 80 g/min.

The hydrated gel crosslinked polymer thus fragmented was spread over a stainless wire gauze having a mesh size of 850 μm, and dried by hot air of 180° C. for 30 minutes. The dried was crushed by use of the roll mill (WML type roll crusher manufactured by Inoguchi Giken Co., Ltd.), and sieved by use of the JIS established sieve having mesh sizes of 850 μm and 45 μm.

As a result, unevenly crushed water-absorbent resin powder (3) having 97% by weight of solid content, a weight average particle diameter (D50) of 446 μm, and a logarithmic standard deviation (σζ) of particle size distribution of 0.39 was obtained. Table 1 shows physical properties of the obtained water-absorbent resin powder (3).

Example 4

Unevenly crushed water-absorbent resin powder (4) having 96% by weight of solid content, a weight average particle diameter (D50) of 442 μm, and a logarithmic standard deviation (σζ) of particle size distribution of 0.39 was obtained in the same manner as in Example 3 except that the Kinoshita glass ball filter (filter particle No. 4) manufactured by Kinoshita Rika Kogyo Co., Ltd. was substituted for the micro bubble generator (type: OM4-GP-040) manufactured by AURA TEC and then introducing nitrogen gas into the solution (A) for one minute. Table 1 shows physical properties of the obtained water-absorbent resin powder (4).

Example 5

Unevenly crushed water-absorbent resin powder (5) having 97% by weight of solid content, a weight average particle diameter (D50) of 451 μm, and a logarithmic standard deviation (σζ) of particle size distribution of 0.36 was obtained in the same manner as in Example 3 except that 0.025 g of polyoxyethylene (20) sorbitane monostearate (manufactured by Kao Corporation) was dissolved as a surface active agent in the solution (A). Table 1 shows physical properties of the obtained water-absorbent resin powder (5).

Example 6

Firstly, 39.75 g of acrylic acid, 379.07 g of 37% by weight of sodium acrylate solution, 0.995 g of polyethylene glycol diacrylate (molecular weight 523), 176.31 g of deionized water (ion exchange water), and 0.004 g of polyoxyethylene (20) sorbitane monostearate (manufactured by Kao Corporation) were mixed in a 1-liter polypropylene vessel so as to prepare a monomer solution. Thereafter, micro bubbles of nitrogen gas were introduced as introduced gas into the monomer solution for 1 minute under an absolute pressure of 0.25 MPa to 0.30 MPa by use of the micro bubble generator (manufactured by AURA TEC, Type: OM4-GP-040), the monomer solution being adjusted to 25° C.

Thereafter, 2.45 g of 10% by weight of sodium persulfate solution, 1.02 g of 0.1% by weight of L-ascorbic acid solution, and 0.41 g of 0.1% by weight of hydrogen peroxide water were added to the monomer solution with stirred. In approximately 1 minute after the addition, polymerization was started at a temperature of 25.2° C.

The polymerization was carried out at 25° C. to 90° C. In 1 hour after the start of the polymerization, a hydrated gel crosslinked polymer was taken out of the polypropylene vessel. The produced hydrated gel crosslinked polymer was crushed by use of the meat chopper (MEAT-CHOPPER TYPE: 12VR-400KSOX manufactured by IIZUKA KOGYO KABUSHIKIKAISHA, die hole diameter: 6.4 mm, number of holes: 38, die thickness: 8 mm). In this manner, the hydrated gel crosslinked polymer thus fragmented was produced.

The hydrated gel crosslinked polymer thus fragmented was spread over a stainless wire gauze having a mesh size of 850 μm, and dried by hot air of 180° C. for 45 minutes. The dried was crushed by use of the roll mill (WML type roll crusher manufactured by Inoguchi Giken Co., Ltd.), and sieved by use of the JIS established sieve having mesh sizes of 850 μm and 45 μm.

As a result, unevenly crushed water-absorbent resin powder (6) having 95% by weight of solid content, a weight average particle diameter (D50) of 460 μm, and a logarithmic standard deviation (σζ) of particle size distribution of 0.38 was obtained. Table 1 shows physical properties of the obtained water-absorbent resin powder (6).

Comparative Example 1

Unevenly crushed comparative water-absorbent resin powder (1) having 96% by weight of solid content, a weight average particle diameter (D50) of 455 μm, and a logarithmic standard deviation (σζ) of particle size distribution of 0.37 was obtained in the same manner as in Example 1 except that no micro bubble was introduced into the monomer solution. Table 1 shows physical properties of the obtained comparative water-absorbent resin powder (1).

Comparative Example 2

Unevenly crushed comparative water-absorbent resin powder (2) having 97% by weight of solid content, a weight average particle diameter (D50) of 448 μm, and a logarithmic standard deviation (σζ) of particle size distribution of 0.36 was obtained in the same manner as in Example 2 except that no micro bubble was introduced into the monomer solution. Table 1 shows physical properties of the obtained comparative water-absorbent resin powder (2).

The obtained comparative water-absorbent resin particles (2) was sieved by use of the JIS established sieve having mesh sizes of 425 μm and 300 μm. FIG. 5 (photo 4) shows an SEM (scanning electron microscope) photograph of particles that could pass through the mesh size of 425 μm but could not pass through the mesh size of 300 μm.

Comparative Example 3

Unevenly crushed comparative water-absorbent resin powder (3) having 97% by weight of solid content, a weight average particle diameter (D50) of 442 μm, and a logarithmic standard deviation (σζ) of particle size distribution of 0.38 was obtained in the same manner as in Example 3 except that no micro bubble was introduced into the solution (A). Table 1 shows physical properties of the obtained comparative water-absorbent resin powder (3).

Comparative Example 4

Unevenly crushed comparative water-absorbent resin powder (4) having 97% by weight of solid content, a weight average particle diameter (D50) of 450 μm, and a logarithmic standard deviation (σζ) of particle size distribution of 0.37 was obtained in the same manner as in Example 6 except that no micro bubble was introduced into the monomer solution. Table 1 shows physical properties of the obtained comparative water-absorbent resin powder (4).

TABLE 1

| | | CRC [g/g] | FSR [g/g/sec] | Bulk specific gravity [g/cm³] | D50 [μm] | σζ | Solid content [wt %] | Water-absorbency index |
|---|---|---|---|---|---|---|---|---|
| Example 1 | Water-absorbent resin powder (1) | 34.0 | 0.30 | 0.67 | 453 | 0.36 | 96 | 91 |
| Example 2 | Water-absorbent resin powder (2) | 34.9 | 0.32 | 0.66 | 459 | 0.38 | 96 | 97 |
| Example 3 | Water-absorbent resin powder (3) | 34.5 | 0.35 | 0.66 | 446 | 0.39 | 97 | 103 |

TABLE 1-continued

|  |  | CRC [g/g] | FSR [g/g/sec] | Bulk specific gravity [g/cm³] | D50 [μm] | σζ | Solid content [wt %] | Water-absorbency index |
|---|---|---|---|---|---|---|---|---|
| Example 4 | Water-absorbent resin powder (4) | 31.9 | 0.37 | 0.67 | 442 | 0.39 | 96 | 110 |
| Example 5 | Water-absorbent resin powder (5) | 33.4 | 0.41 | 0.66 | 451 | 0.36 | 97 | 122 |
| Example 6 | Water-absorbent resin powder (6) | 39.3 | 0.31 | 0.67 | 460 | 0.38 | 95 | 96 |
| Comparative Example 1 | Comparative water-absorbent resin powder (1) | 34.0 | 0.27 | 0.66 | 455 | 0.37 | 96 | 81 |
| Comparative Example 2 | Comparative water-absorbent resin powder (2) | 34.6 | 0.26 | 0.67 | 448 | 0.36 | 97 | 78 |
| Comparative Example 3 | Comparative water-absorbent resin powder (3) | 34.4 | 0.29 | 0.66 | 442 | 0.38 | 97 | 85 |
| Comparative Example 4 | Comparative water-absorbent resin powder (4) | 40.2 | 0.27 | 0.66 | 450 | 0.37 | 97 | 80 |

As is clear from Table 1, the water-absorbent resin powders (1) to (3) and (6) obtained in Examples 1 to 3 and 6 respectively have an FSR (water-absorption rate) greater by 0.03 point to 0.06 point than those of comparative water-absorbent resin powders (1) to (4) obtained in Comparative Examples 1 to 4, respectively. 0.03 point to 0.06 point corresponds to 7 seconds to 14 seconds in a case where the point is converted into a water-absorbent time period during FSR measurement. Introducing the micro bubbles into the monomer solution or the like makes it possible to improve a physical property (FSR: water-absorbent rate) of the produced water-absorbent resin powder.

Comparative Example 5

Figure 3:
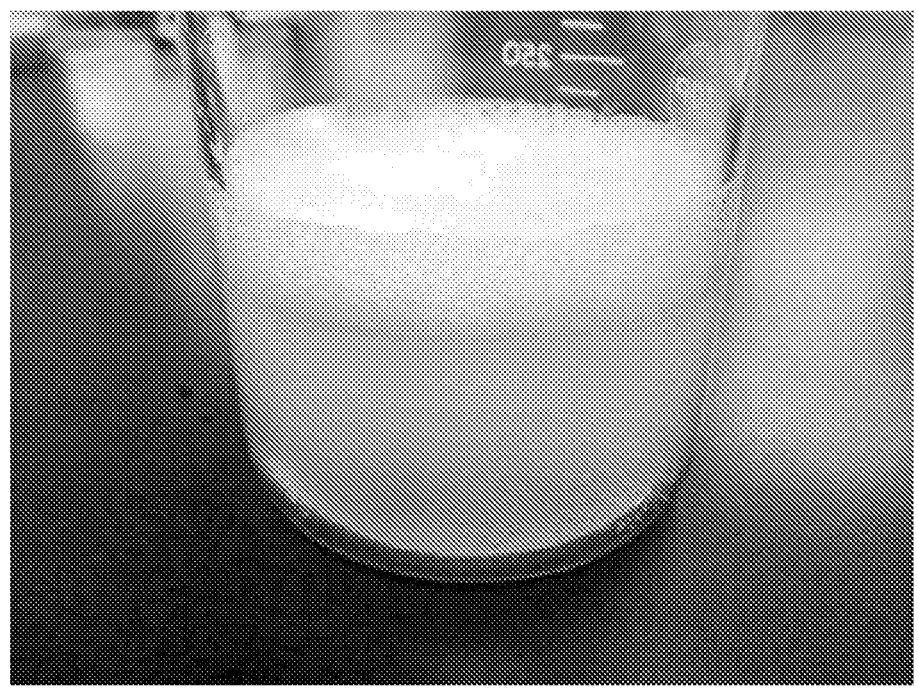
FIG. 3 is a photograph showing a state of a monomer solution in which polymerization had not yet carried out in Comparative Example 5.

Foam polymerization was carried out by use of carbonate in accordance with Patent Literatures 11 to 18. Specifically, unevenly crushed comparative water-absorbent resin powder (5) having 96% by weight of solid content, a weight average particle diameter (D50) of 436 μm, and a logarithmic standard deviation (σζ) of particle size distribution of 0.37 was obtained in the same manner as in Comparative Example 3 expect that 5.2 g of sodium hydrogen carbonate (manufactured by Wako Pure Chemicals Industries Ltd.) was added prior to adding 17.55 g of 4% by weight of sodium persulfate solution. Table 2 shows physical properties of the obtained comparative water-absorbent resin powder (5). FIG. 3 (photo 2) shows a state of a monomer solution to which sodium hydrogen carbonate was added. Not only Patent Literatures 11 to 18 but also Japanese Patent Application Publication Tokukai No. 2001-151804 A (organism immobilization support for wastewater treatment) or the like disclose neither the water-absorbent resin nor the polymeric powder, but disclose the foam polymerization due to carbonate.

Reference Example 1

The comparative water-absorbent resin powder (3) obtained in Comparative Example 3 was sieved by use of a JIS established sieve having mesh sizes of 150 μm and 45 μm. As a result, reference water-absorbent resin powder (1) containing 91% by weight of particles that passed through the mesh size of 150 μm but did not pass through the mesh size of 45 μm, and 9% by weight of particles that passed through the mesh size of 45 μm was obtained.

Comparative Example 6

Polymerization was carried out in the presence of water-absorbent resin powder in accordance with Patent Literature 28. Specifically, unevenly crushed comparative water-absorbent resin powder (6) having 97% by weight of solid content, a weight average particle diameter (D50) of 457 μm, and a logarithmic standard deviation (σζ) of particle size distribution of 0.37 was obtained in the same manner as in Comparative Example 3 except that 25.8 g of reference water-absorbent resin powder (1) obtained in Reference Example 1 was added immediately after adding 17.55 g of 4% by weight of sodium persulfate solution. Table 2 shows physical properties of the obtained comparative water-absorbent resin powder (6).

Comparative Example 7

Foam polymerization was carried out by bubble dispersion in accordance with Patent Literature 23.

Unevenly crushed comparative water-absorbent resin powder (7) having 95% by weight of solid content, a weight average particle diameter (D50) of 450 μm, and a logarithmic standard deviation (σζ) of particle size distribution of 0.39 was obtained by fragmenting, drying, crushing, and sieving in the same manner as in Example 6 a hydrated gel crosslinked polymer produced by the foam polymerization. Table 2 shows physical properties of the obtained comparative water-absorbent resin powder (7).

Comparative Example 8

The comparative water-absorbent resin powder (3) obtained in Comparative Example 3 was sieved by use of a JIS established sieve having a mesh size of 600 μm. As a result, unevenly crushed comparative water-absorbent resin powder (8) having 96% by weight of solid content, a weight average particle diameter (D50) of 340 μm, and a logarithmic standard deviation (σζ) of particle size distribution of 0.32 was obtained. Table 2 shows physical properties of the obtained comparative water-absorbent resin powder (8).

TABLE 2

Conventional method for increasing water-absorption rate

| | | CRC [g/g] | FSR [g/g/sec] | Bulk specific gravity [g/cm³] | D50 [μm] | σζ | Solid content [wt %] | Water-absorbency index |
|---|---|---|---|---|---|---|---|---|
| Comparative Example 5 | Comparative water-absorbent resin powder (5) | 36.0 | 0.28 | 0.67 | 436 | 0.37 | 96 | 82 |
| Comparative Example 6 | Comparative water-absorbent resin powder (6) | 33.3 | 0.30 | 0.65 | 457 | 0.37 | 97 | 89 |
| Comparative Example 7 | Comparative water-absorbent resin powder (7) | 37.8 | 0.48 | 0.53 | 450 | 0.39 | 95 | 114 |
| Comparative Example 8 | Comparative water-absorbent resin powder (8) | 34.8 | 0.32 | 0.69 | 340 | 0.32 | 96 | 75 |

As is clear from Table 2, the comparative water-absorbent resin powders (5) to (7) obtained by the conventional foam polymerization method do not have an improved FSR. In order to improve FSR, each of weight average particle diameters (D50) of the water-absorbent resin powders (5) to (7) should be reduced by 100 μm. However, such a weight average particle diameter reduced by 100 μm causes increase in fine powder or powder dust, and deterioration in liquid permeability.

Example 7

Unevenly crushed water-absorbent resin powder (7) having 97% by weight of solid content, a weight average particle diameter (D50) of 451 μm, and a logarithmic standard deviation (σζ) of particle size distribution of 0.36 was obtained in the same manner as in Example 3 except that the solution (A) into which micro bubbles of nitrogen gas was introduced as introduced gas for 1 minute in Example 3 (kaolin turbidity: 530 [mg/L (degree)]) was let stand (with no stirring) in a polypropylene vessel for 240 seconds, so as to defoam the monomer solution (kaolin turbidity: 0.6 [mg/L (degree)], substantially transparent). Table 3 shows physical properties of the obtained water-absorbent resin powder (7).

Example 8

Unevenly crushed water-absorbent resin powder (8) having 97% by weight of solid content, a weight average particle diameter (D50) of 463 μm, and a logarithmic standard deviation (σζ) of particle size distribution of 0.37 was obtained in the same manner as in Example 5 except that the solution (A) into which micro bubbles of nitrogen gas was introduced as introduced gas for 1 minute in Example 5 was let stand (with no stirring) in a polypropylene vessel for 240 seconds, so as to defoam the monomer solution. Table 3 shows physical properties of the obtained water-absorbent resin powder (8).

Comparative Example 9

Unevenly crushed comparative water-absorbent resin powder (9) having 96% by weight of solid content, a weight average particle diameter (D50) of 450 μm, and a logarithmic standard deviation (σζ) of particle size distribution of 0.38 was obtained in the same manner as in Comparative Example 5 except that 4% by weight of sodium persulfate solution was added to the solution (A) to which sodium hydrogen carbonate was added and then which was let stand (with no stirring) in a polypropylene vessel for 240 seconds, so as to defoam the solution (A). Table 3 shows physical properties of the obtained comparative water-absorbent resin powder (9).

Comparative Example 10

Unevenly crushed comparative water-absorbent resin powder (10) having 95% by weight of solid content, a weight average particle diameter (D50) of 424 μm, and a logarithmic standard deviation (σζ) of particle size distribution of 0.36 was obtained in the same manner as in Comparative Example 7 except that the monomer solution stirred at a high-rate of 3000 rpm in nitrogen gas stream was defoamed by stirring at a rate of 100 rpm for 240 seconds. Table 3 shows physical properties of the obtained comparative water-absorbent resin powder (10).

TABLE 3

Influence due to defoaming

| | | CRC [g/g] | FSR [g/g/sec] | Bulk specific gravity [g/cm³] | D50 [μm] | σζ | Solid content [wt %] | Water-absorbency index |
|---|---|---|---|---|---|---|---|---|
| Example 7 | Water-absorbent resin powder (7) | 34.7 | 0.33 | 0.67 | 451 | 0.36 | 97 | 100 |
| Example 8 | Water-absorbent resin powder (8) | 33.3 | 0.40 | 0.66 | 463 | 0.37 | 97 | 122 |
| Comparative Example 9 | Comparative water-absorbent resin powder (9) | 36.4 | 0.26 | 0.67 | 450 | 0.38 | 96 | 78 |

TABLE 3-continued

Influence due to defoaming

|  |  | CRC [g/g] | FSR [g/g/sec] | Bulk specific gravity [g/cm³] | D50 [μm] | σζ | Solid content [wt %] | Water-absorbency index |
|---|---|---|---|---|---|---|---|---|
| Comparative Example 10 | Comparative water-absorbent resin powder (10) | 38.3 | 0.34 | 0.62 | 424 | 0.36 | 95 | 89 |

As is clear from Table 3, the monomer solutions into which micro bubbles are introduced have a substantially equivalent water-absorption rate (FSR) and bulk specific gravity regardless of whether to be defoamed (see Examples 7 and 8). Meanwhile, foam polymerization carried out by a conventional technique causes deterioration in water-absorption rate (FSR) and increase in bulk specific gravity due to defoaming (see Comparative Examples 9 and 10). It is considered that these deterioration and increase were caused by reduction in quantity of the bubbles that the water-absorbent resin powder contained.

Further, it is apparent from comparison of Example 3 (kaolin turbidity: 530 [mg/L], turbid) with Example 7 (kaolin turbidity: 0.6 [mg/L], substantially transparent) that the monomer solution made transparent by the defoaming can have a sufficiently improved water-absorption rate (FSR) after the polymerization. Further, the defoaming eliminates extremely large bubbles (pores) from the water-absorbent resin powder. This leads to uniformly shaped water-absorbent resin. This also contributes to improvement of tolerance to damage described in Patent Literatures 29, 32 to 34 and the like.

Example 9

A surface crosslinking solution containing 0.48 part by weight of 1,4-butanediol, 0.75 part by weight of propylene glycol, and 4.0 parts by weight of deionized water was evenly sprayed over 100 parts by weight of the water-absorbent resin powder (3) obtained in Example 3, and mixed therewith. Thereafter, the water-absorbent resin particles mixed with the surface crosslinking solution were surface-crosslinked for 45 minutes by use of a hot-air drier (at temperature of 180° C.). Thereafter, the dried water-absorbent resin particles were crushed to have a size capable of passing through the JIS established sieve having the mesh size of 850 μm. In this manner, surface-crosslinked water-absorbent resin particles were produced.

Thereafter, a mixed solution containing 0.80 part by weight of 27% by weight of aluminum sulfate solution (8% by weight based on aluminum oxide), 0.134 part by weight of 60% by weight of sodium lactate solution, and 0.016 part by weight of propylene glycol was added to 100 parts by weight of the produced surface-crosslinked water-absorbent resin particles. Thereafter, the water-absorbent resin particles to which the mixed solution was added were dried at 60° C. for 1 hour in a windless state. Thereafter, the dried particles were sieved by the JIS established sieve having a mesh size of 850 μm. In this manner, water-absorbent resin powder (9) was obtained. Table 4 shows physical properties of the obtained water-absorbent resin powder (9).

Comparative Example 11

As with in Example 9, the comparative water-absorbent resin powder (3) obtained in Comparative Example 3 was surface-crosslinked, and had added thereto the mixed solution containing the aluminum sulfate solution, the sodium lactate solution and the propylene glycol. Thereafter, an operation identical to that carried out in Example 9 was carried out. In this manner, comparative water-absorbent resin powder (11) was obtained. Table 4 shows physical properties of the obtained comparative water-absorbent resin powder (11).

Comparative Example 12

The comparative water-absorbent resin powder (7) obtained in Comparative Example 7 was subjected to an operation identical to that carried out in Comparative Example 11. In this manner, comparative water-absorbent resin powder (12) was obtained. Table 4 shows physical properties of the obtained comparative water-absorbent resin powder (12).

Comparative Example 13

The comparative water-absorbent resin powder (8) obtained in Comparative Example 8 was subjected to the operation identical to that carried out in Comparative Example 11. In this manner, comparative water-absorbent resin powder (13) was obtained. Table 4 shows physical properties of the obtained comparative water-absorbent resin powder (13).

TABLE 4

Physical property of water-absorbent resin powder which physical property is obtained after surface-crosslinked (Particularly, liquid permeability SFC)

|  |  | CRC [g/g] | FSR [g/g/sec] | Bulk specific gravity [g/cm³] | D50 [μm] | SFC [×10⁻⁷·cm³·s·g⁻¹] | Water-absorbency index |
|---|---|---|---|---|---|---|---|
| Example 9 | Water-absorbent resin powder (9) | 26.3 | 0.36 | 0.67 | 432 | 147 | 104 |

TABLE 4-continued

Physical property of water-absorbent resin powder which physical property is obtained after surface-crosslinked (Particularly, liquid permeability SFC)

|  |  | CRC [g/g] | FSR [g/g/sec] | Bulk specific gravity [g/cm³] | D50 [μm] | SFC [×10⁻⁷ · cm³ · s · g⁻¹] | Water-absorbency index |
|---|---|---|---|---|---|---|---|
| Comparative Example 11 | Comparative water-absorbent resin powder (11) | 26.5 | 0.29 | 0.66 | 429 | 151 | 82 |
| Comparative Example 12 | Comparative water-absorbent resin powder (12) | 26.1 | 0.33 | 0.69 | 322 | 92 | 73 |
| Comparative Example 13 | Comparative water-absorbent resin powder (13) | 27.6 | 0.50 | 0.55 | 411 | 48 | 113 |

Table 4 shows liquid permeability (SFC), water-absorption rate (FSR) and the like of the surface-crosslinked water-absorbent resin particles. The water-absorbent resin particles (9) of Example 9 having an FSR of 0.36, into which micro bubbles are introduced, has an SFC substantially equal to that of the comparative water-absorbent resin (11) having a FSR of 0.29, into which micro bubbles are not introduced. However, the comparative water-absorbent resin particles (12) and (13) whose water-absorption rate was improved by a conventional method have a greatly reduced liquid permeability (SFC), compared to that attained by the method of present invention.

Generally, a water-absorption rate is adversely proportional to a liquid permeability. Table 4 shows that the present invention makes it possible to improve FSR without deteriorating liquid permeability, by introducing micro bubbles.

Example 10

Unevenly crushed water-absorbent resin powder (10) having 96% by weight of solid content, a weight average particle diameter (D50) of 453 μm, and a logarithmic standard deviation (σζ) of particle size distribution of 0.39 was obtained in the same manner as in Example 6 except that the quantity of polyoxyethylene(20)sorbitane monostearate (manufactured by Kao Corporation) to be added was changed to 0.01 g. Table 5 shows physical properties of the obtained water-absorbent resin particles (10).

Example 11

Unevenly crushed water-absorbent resin powder (11) having 96% by weight of solid content, a weight average particle diameter (D50) of 469 μm, and a logarithmic standard deviation (σζ) of particle size distribution of 0.39 was obtained in the same manner as in Example 10 except that the quantity of polyoxyethylene(20)sorbitane monostearate (manufactured by Kao Corporation) to be added was changed to 0.02 g. Table 5 shows physical properties of the obtained water-absorbent resin powder (11).

Comparative Example 14

Unevenly crushed comparative water-absorbent resin powder (14) having 96% by weight of solid content, a weight average particle diameter (D50) of 450 μm, and a logarithmic standard deviation (σζ) of particle size distribution of 0.36 was obtained in the same manner as in Example 10 except that the quantity of polyoxyethylene(20)sorbitane monostearate (manufactured by Kao Corporation) to be added was changed to 0.03 g. Table 5 shows physical properties of the obtained comparative water-absorbent resin powder (14).

Comparative Example 15

Unevenly crushed comparative water-absorbent resin powder (15) having 95% by weight of solid content, a weight average particle diameter (D50) of 466 μm, and a logarithmic standard deviation (σζ) of particle size distribution of 0.39 was obtained in the same manner as in Example 10 except that the quantity of polyoxyethylene(20)sorbitane monostearate (manufactured by Kao Corporation) to be added was changed to 0.10 g. Table 5 shows physical properties of the obtained comparative water-absorbent resin powder (15).

Comparative Example 16

Unevenly crushed comparative water-absorbent resin powder (16) having 97% by weight of solid content, a weight average particle diameter (D50) of 448 μm, and a logarithmic standard deviation (σζ) of particle size distribution of 0.36 was obtained in the same manner as in Example 10 except that the quantity of polyoxyethylene(20)sorbitane monostearate (manufactured by Kao Corporation) to be added was changed to 0.20 g. Table 5 shows physical properties of the obtained comparative water-absorbent resin powder (16).

TABLE 5

Influence due to quantity of a surface active agent to be used (particularly, influence on surface tension

|  |  | Amount of surface active agent [ppm] | CRC [g/g] | Surface tension [mN/m] | D50 [μm] | σζ | Solid content [wt %] |
|---|---|---|---|---|---|---|---|
| Example 6 | Water-absorbent resin powder (6) | 20 | 39.3 | 73.3 | 460 | 0.38 | 95 |

TABLE 5-continued

Influence due to quantity of a surface active agent to be used (particularly, influence on surface tension

| | | Amount of surface active agent [ppm] | CRC [g/g] | Surface tension [mN/m] | D50 [μm] | σζ | Solid content [wt %] |
|---|---|---|---|---|---|---|---|
| Example 10 | Water-absorbent resin powder (10) | 50 | 38.6 | 72.8 | 453 | 0.39 | 96 |
| Example 11 | Water-absorbent resin powder (11) | 100 | 38.7 | 68.7 | 469 | 0.39 | 96 |
| Comparative Example 14 | Comparative water-absorbent resin powder (14) | 150 | 38.4 | 67.5 | 450 | 0.36 | 96 |
| Comparative Example 15 | Comparative water-absorbent resin powder (15) | 500 | 39.0 | 57.3 | 466 | 0.39 | 95 |
| Comparative Example 16 | Comparative water-absorbent resin powder (16) | 1000 | 39.8 | 54.8 | 448 | 0.36 | 97 |

Table 5 shows a relationship of an amount of the surface active agent to be used with surface tension. (FIG. 1 plots a relationship of the amount of the surface active agent to be used with the surface tension.) As is clear from Table 5 and FIG. 1, the amount of surface active agent to be used is preferably not more than 300 ppm, more preferably less than 100 ppm in order to attain surface tension suitable for disposable diapers or the like.

Further, the water-absorbent resin powder (10) shown in Table 5 has a bulk specific gravity of 0.68 and a water-absorbency index of 92. It is also apparent that the method of the present invention can produce a water-absorbent resin having a water-absorbency index of not less than 90.

Example 12

Firstly, 900 mL of monomer solution into which micro bubbles (nitrogen gas) were not introduced yet in Example 1 was measured out by use of a 1000 mL of messcylinder. Thereafter, micro bubbles (nitrogen gas) were introduced into the monomer solution for 5 minutes under an absolute pressure of 0.25 MPa to 0.30 MPa by use of the micro bubble generator used in Example 1. Thereafter, change in volume of the monomer solution was observed.

It was found that the monomer solution into which micro bubbles was introduced had a volume of 910 mL and an expansivity of 1.01.

Comparative Example 17

Firstly, 500 mL of monomer solution to which sodium hydrogen carbonate (manufactured by Wako Pure Chemicals Industries Ltd.) was not added yet in Comparative Example 5 was measured out by use of a 1000 mL of messcylinder. Thereafter, 2.2 g of sodium hydrogen carbonate (manufactured by Wako Pure Chemicals Industries Ltd.) was added to the monomer solution as in Comparative Example 5. It was found that the monomer solution to which sodium hydrogen carbonate was added had a volume of 590 mL and an expansivity of 1.18.

The production method of the present invention makes it possible to provide water-absorbent resin powder having a water-absorbency index of not less than 90, particularly not less than 120. Further, according to the production method of the present invention, a water-absorbent resin that is not surface-crosslinked, particularly surface-crosslinked shows excellent SFC and impact resistance. Therefore, absorbent products (particularly, disposable diapers) employing such a water-absorbent resin show an excellent property.

As is clear from FIG. 2 (the monomer solution that was not polymerized in Example 1), the monomer solution into which micro bubbles of nitrogen gas were introduced hardly contained large bubbles on a wall of a vessel in which the monomer solution was stored and on a surface of the monomer solution, but contained dispersed fine bubbles. Meanwhile, as is clear from FIG. 3 (the monomer solution that was not polymerized in Comparative Example 5), the monomer solution contained large bubbles on a wall of a vessel in which the monomer solution was stored and on a surface of the monomer solution. Such large bubbles contained in the monomer solution causes deterioration in bulk specific gravity, tolerance to damage and liquid permeability (SFC) of the produced water-absorbent resin powder.

As is clear from FIG. 4 (Example 2), bubbles that are not recognized in FIG. 5 (Comparative Example 2) are introduced into water-absorbent resin powder shown in FIG. 4.

Example 13

Stirring Reynolds Number 41400

A monomer solution containing acrylic acid, sodium hydroxide, polyethylene glycol diacrylate (average molecular weight 487), 1-hydroxycyclohexylphenylketone, and water was continuously prepared. Specifically, (i) acrylic acid, sodium hydroxide and water each having 45% by weight of monomer concentration, the acrylic acid having a neutralization ratio of 70 mol %, (ii) 0.05 mol % of polyethylene glycol diacrylate to the acrylic acid, and (iii) 0.01% by weight of 1-hydroxycyclohexylphenylketone to the acrylic acid were added to a monomer solution. Thereafter, the monomer solution was adjusted to 95±1° C.

Thereafter, 0.5 m³/hr of nitrogen gas was introduced into the monomer solution, and then the monomer solution was continuously supplied into a static mixer at 8500 kg/hr. That is, the monomer solution mixed with nitrogen gas was supplied into the static mixer.

The static mixer was provided with a tube having a bore diameter of 37 mm in which tube a six-times twisted element having a total length of 342 mm and a diameter of 32 mm was provided. The monomer solution and the nitrogen gas were stirred in the mixer. As a result, the nitrogen gas was suspended in the monomer solution. Bubbles of the nitrogen gas had a diameter of 100 μm. A stirring Reynolds number calculated by the formula was 41400 (ρ: 1160, μ: 0.001).

Thereafter, a sodium persulfate solution was mixed with the suspended monomer solution wherein a ratio of sodium persulfate to the acrylic acid was 0.12 mol to 1 mol. In this manner, a monomer mixed solution was prepared.

The monomer mixed solution was continuously supplied into a belt-type polymerization device, and polymerized in the polymerization device. As a result, a belt-shaped polymerization gel was produced. The belt-type polymerization device employed in the present Example is provided with an endless belt whose surface is coated with fluorocarbon resin, a UV lamp, and a suction pipe for collecting vapor.

Thereafter, the belt-shaped polymerization gel produced in the polymerization device was continuously crushed by use of a meat chopper, and dried by hot air of 180° C. The dried was crushed by use of a roll mill. As a result, a base polymer was obtained. Thereafter, the base polymer was mixed with a solution containing 0.56% by weight of propylene glycol, 0.34% by weight of 1,4-butanediol, and 3% by weight of water by use of a stirring device, heated by a paddle drier, and then cooled by a paddle cooler. In this manner, a water-absorbent resin (13) was obtained. Table 6 numerically shows physical properties of the water-absorbent resin (13) of the present invention.

Comparative Example 18

Stirring Reynolds Number 2280

The following describes a comparative example where a stirring Reynolds number is less than 10000, in comparison with Example 13 (stirring Reynolds number 41400).

A monomer solution containing (i) 5.83 g/s of 48.5% by weight of sodium hydroxide solution, (ii) 7.24 g/s of acrylic acid, (iii) 0.0287 g/s of 30% by weight of polyethylene glycol diacrylate (average molecular weight 487) solution, (iv) 0.0893 g/s of solution obtained by dissolving 0.989 part by weight of 2-hydroxymethyl-2-methylpropiophenone and 1.08 parts by weight of 45% by weight of diethylenetriamine pentaacetic acid, pentasodium solution in 97.4 parts by weight of 20% by weight of acrylic solution, and (v) 3.32 g/s of water was continuously prepared. The monomer solution was adjusted to 95±1° C.

The monomer solution was supplied into a static mixer including a tube having a bore diameter of 6 mm in which tube a one and half times twisted element having a length of 18.6 mm and a diameter of 6 mm was provided, and stirred in the static mixer. Thereafter, 0.151 g/s of 2% by weight of sodium persulfate solution was mixed with the monomer solution at a place of the element which place was positioned downstream by 3 cm from an end part of the element. In this manner, a monomer mixed solution was prepared. A stirring Reynolds number of the monomer mixed solution calculated by the formula was 2280 (ρ=1160, μ=0.001).

The monomer mixed solution was continuously supplied into and polymerized in a belt-type polymerization device. As a result, a belt-shaped polymerization gel was produced. The belt-shaped polymerization device employed in the present Comparative Example is provided with an endless belt whose surface is coated with fluorocarbon resin, a UV lamp, and a suction pipe for collecting vapor. Further, the belt-type polymerization device has a length of 3.8 m and a width of 60 cm.

Thereafter, the belt-shaped polymerization gel produced in the polymerization device was continuously crushed by use of a meat chopper, and dried by hot air of 180° C. The dried was crushed by use of a roll mill. As a result, a base polymer was obtained. The base polymer was mixed with a solution containing 0.56% by weight of propylene glycol, 0.34% by weight of 1,4-butanediol, and 3% by weight of water by use of a stirring device, heated by a paddle drier, and then cooled by a paddle cooler. In this manner, a water-absorbent resin (a) was produced. Table 6 numerically shows physical properties of the water-absorbent resin (a).

U.S. Pat. No. 7,265,190 (family Japanese Patent No. 2004-155693) does not disclose the foam polymerization by mixing inert gas. The stirring Reynolds number of 2280 (maximum) calculated in the present Example yields an effect enough for mixing a polymerization initiator. However, the stirring Reynolds number of 2280 does not yield an effect enough for increasing an absorption rate due to the foam polymerization, as shown in Comparative Example 18.

Example 14

Usage of a Micro Bubble Generator

A monomer solution containing acrylic acid, 48.5% by weight of sodium hydroxide solution, 30% by weight of polyethylene glycol diacrylate (average molecular weight 487) solution, 1-hydroxycyclohexylphenylketone, and water was continuously prepared. Specifically, (i) acrylic acid, sodium hydroxide and water each having 45% by weight of monomer concentration, the acrylic acid having a neutralization ratio of 70 mol %, (ii) 0.05 mol % of polyethylene glycol diacrylate to the acrylic acid, and (iii) 0.01% by weight of 1-hydroxycyclohexylphenylketone to the acrylic acid were added to a monomer solution. Thereafter, the monomer solution was adjusted to 95±1° C. Note that the acrylic acid, the sodium hydroxide solution and the water were dehydrated in advance by injecting nitrogen thereinto.

Thereafter, 60 L/hr of nitrogen gas was injected into the monomer solution, and then the monomer solution was continuously supplied into an OHR line mixer at 1200 kg/hr. That is, the monomer solution mixed with nitrogen gas was supplied into the OHR line mixer.

The OHR line mixer was an OHR LINE MIXER (type: MX-E10) manufactured by OHR LABORATORY CORPORATION. The monomer solution and the nitrogen gas were stirred by the OHR line mixer. As a result, the nitrogen gas was suspended in the monomer solution. The monomer solution in which the nitrogen gas was suspended was apparently white. Bubbles of the suspended nitrogen gas had a diameter of 15 μm. According to a catalog of the OHR LINE MIXER, the OHR LINE MIXER is a static mixer, and includes a mushroom-shaped projection therein. Liquid and gas continuously collide with the mushroom-shaped projection whereby micro bubbles are generated.

Thereafter, a sodium persulfate solution was mixed with the suspended monomer solution wherein a ratio of sodium persulfate to the acrylic acid was 0.12 mol to 1 mol. In this manner, a monomer mixed solution was prepared.

The monomer mixed solution was continuously supplied into and polymerized in a belt-type polymerization device. As a result, a belt-shaped polymerization gel was produced. The belt-shaped polymerization device employed in the present Example is provided with an endless belt whose surface is coated with fluorocarbon resin, a UV lamp, and a suction pipe for collecting vapor.

Thereafter, the belt-shaped polymerization gel produced in the polymerization device was continuously crushed by use of a meat chopper, and dried by hot air of 180° C. The dried was crushed by use of a roll mill. As a result, a base polymer was obtained. The base polymer was mixed with a solution containing 0.56% by weight of propylene glycol to the base polymer, 0.34% by weight of 1,4-butanediol to the base polymer, and 3% by weight of water to the base polymer by use of a stirring device, heated by a paddle drier, and then cooled by a paddle cooler. In this manner, a water-absorbent resin (14) was obtained. Table 6 numerically shows physical properties of the water-absorbent resin (14) of the present invention.

Comparative Example 19

A water-absorbent resin (b) was produced in the same manner as in Example 14 except that the OHR line mixer was not employed as a micro bubble generator. Table 6 numerically shows physical properties of the comparative water-absorbent resin (b).

TABLE 6

Estimation result

|  |  | Example 13 | Comparative Example 18 | Example 14 | Comparative Example 19 |
|---|---|---|---|---|---|
| Water-absorbent resin |  | Water-absorbent resin (13) | Water-absorbent resin (a) | Water-absorbent resin (14) | Water-absorbent resin (b) |
| Water-absorption ratio under no pressure | [g/g] | 29.9 | 30.2 | 28.0 | 28.7 |
| Water-absorption ratio under pressure of 4.83 kPa | [g/g] | 25.8 | 25.5 | 25.0 | 24.8 |
| Water-absorption rate | [g/g/sec] | 0.33 | 0.22 | 0.45 | 0.16 |

Example 15

A water-absorbent resin (15) was produced in the same manner as in Example 13 except that the monomer solution into which nitrogen gas was introduced and which was continuously supplied into the static mixer was defoamed by continuously mixing inert gas with the monomer solution at (A) of FIG. 6 and circulating the monomer solution. The produced water-absorbent resin (15) has a water-absorption rate of 0.39 [g/g/sec].

As is clear from a comparison of Example 13 (stirring Reynolds number 41400, FSR=0.33) with Comparative Example 18 (stirring Reynolds number 2280, FSR=0.22), and a comparison of Example 14 (use of a micro bubble generator, FSR=0.45) with Comparative Example 19 (nonuse of a micro bubble generator, FSR=0.16) as shown in Table 6, the method of the present invention makes it possible to greatly improve water-absorption rate (FSR) while maintaining or improving water-absorption ratio under no pressure (CRC) and water-absorption ratio under pressure (AAP).

Conventionally, a water-absorption rate is adversely proportional to a water-absorption ratio under pressure. Meanwhile, as is clear from the estimation result of Table 6, the present invention yields an excellent effect of improving the water-absorption rate, compared to a conventional method for improving the water-absorption rate.

The present invention can also be described as follows.

(1) A polyacrylic water-absorbent resin powder production method including the steps of: producing an acrylic monomer solution in which gas is dissolved and/or dispersed; defoaming the acrylic monomer solution if necessary; polymerizing the acrylic monomer solution in the absence of a surface active agent or in the presence of not more than 300 ppm of a surface active agent; during or after the step of polymerizing, fragmenting a hydrated gel crosslinked polymer obtained by polymerizing the acrylic monomer solution; and drying by heat the hydrated gel crosslinked polymer thus fragmented, the gas being dissolved and/or dispersed in the acrylic monomer solution by at least one of the methods (a) to (c):

(a) applying pressure to the acrylic monomer solution and the gas;

(b) creating swirling flows of the acrylic monomer solution and the gas; and (c) introducing the gas with the acrylic monomer solution via fine holes.

(2) The polyacrylic water-absorbent resin powder production method described in (1), further essentially including the step of defoaming the acrylic monomer solution.

(3) A polyacrylic water-absorbent resin powder production method including the steps of: producing an acrylic monomer solution in which gas is dissolved and/or dispersed; defoaming the acrylic monomer solution if necessary; polymerizing the acrylic monomer solution including the bubbles in the absence of a surface active agent or in the presence of not more than 300 ppm of a surface active agent; during or after the step of polymerizing, fragmenting a hydrated gel crosslinked polymer obtained by polymerizing the acrylic monomer solution; and drying by heat the hydrated gel crosslinked polymer thus fragmented, the step of polymerizing the acrylic monomer solution including the bubbles being carried out after the step of defoaming.

(4) The polyacrylic water-absorbent resin powder production method described in any one of (1) to (3) wherein the acrylic monomer solution is oversaturated with the gas in the step of producing the acrylic monomer solution. (5) The polyacrylic water-absorbent resin powder production method described in any one of (1) to (4) wherein the gas dissolved and/or dispersed in the step of producing the acrylic monomer solution is inert gas.

(6) The polyacrylic water-absorbent resin powder production method described in any one of (1) to (5) wherein a liquid-gas mixture of the acrylic monomer solution and the gas is sheared in the step of producing the acrylic monomer solution.

(7) The polyacrylic water-absorbent resin powder production method described in any one of (1) to (6) wherein the step of deforming deforms the acrylic monomer solution for 10 seconds to 3600 seconds.

(8) The polyacrylic water-absorbent resin powder production method described in any one of (1) to (7) wherein the acrylic monomer solution including circulating gas flow is circulated in a circulating tank in the step of defoaming the acrylic monomer solution.

(9) The polyacrylic water-absorbent resin powder production method described in any one of (1) to (8) wherein the step of defoaming is such that the circulation tank has a headspace in which an oxygen concentration is not less than 1% by volume.

(10) The polyacrylic water-absorbent resin powder production method described in any one of (1) to (9) wherein the step of defoaming is carried out by circulating the acrylic monomer solution into which the gas is injected, and the polymerization is carried out by neutralizing at least a part of the acrylic monomer solution supplied from a circulating line, and then supplying, to a polymerization step, the acrylic monomer solution including the neutralized monomer solution.

57

(11) The polyacrylic water-absorbent resin powder production method described in any one of (1) to (10) wherein the step of polymerizing the acrylic monomer solution is such that an expansivity of the monomer is not more than 1.1 times as great as that of a monomer in which gas is not dissolved and/or dispersed.

(12) The polyacrylic water-absorbent resin powder production method described in any one of (1) to (11) wherein the step of polymerizing the acrylic monomer solution is such that the acrylic monomer solution includes micro bubbles or nano bubbles having a volume average diameter of not more than 100 μm.

(13) The polyacrylic water-absorbent resin powder production method described in any one of (1) to (12) wherein the polymerization of the acrylic monomer solution is started at not less than 40° C.

(14) The polyacrylic water-absorbent resin powder production method described in any one of (1) to (13) wherein a temperature of the polymerization of the acrylic monomer solution maximally reaches not less than 100° C.

(15) The polyacrylic water-absorbent resin powder production method described in any one of (1) to (14) wherein the polymerization of the acrylic monomer solution is such that the acrylic monomer solution has an acrylic monomer concentration of not less than 40% by weight.

(16) The polyacrylic water-absorbent resin powder production method described in any one of (1) to (15) further including the step of surface-crosslinking the polyacrylic water-absorbent resin powder after the step of drying it by heat.

(17) The polyacrylic water-absorbent resin powder production method described in any one of (1) to (15) being a method for producing polyacrylic water-absorbent resin powder having a water-absorbency index of not less than 90 and a bulk specific gravity of 0.6 [g/cm$^3$] to 0.8 [g/cm$^3$], the water-absorbency index being calculated by the following formula:

(Water-absorbency index)=(FSR [g/g/sec])×(bulk specific gravity [g/cm$^3$])×(weight average particle diameter [μm]).

(Note that FSR indicates a water-absorption rate at which polyacrylic water-absorbent resin powder absorbs physiological saline so as to have 20 times as much as the volume of the polyacrylic water-absorbent resin powder.)

(18) A water-absorbent resin production method including surface-crosslinking polyacrylic water-absorbent resin powder having a water-absorbency index of not less than 90 and a bulk specific gravity of 0.6 [g/cm$^3$] to 0.8 [g/cm$^3$], the water-absorbency index being calculated by the following formula:

(Water-absorbency index)=(FSR [g/g/sec])×(bulk specific gravity [g/cm$^3$])×(weight average particle diameter [μm]).

(19) Polyacrylic water-absorbent resin powder having a water-absorbency index of not less than 90 and a bulk specific gravity of 0.6 [g/cm$^3$] to 0.8 [g/cm$^3$], the water-absorbency index being calculated by the following formula:

(Water-absorbency index)=(FSR [g/g/sec])×(bulk specific gravity [g/cm$^3$])×(weight average particle diameter [μm]).

(20) The polyacrylic water-absorbent resin powder described in (19) wherein an SFC (Saline Flow Conductivity) is not less than 50 [×10$^{-7}$·cm$^3$·s·g$^{-1}$].

Further, the above method can also be described as follows.

58

(1) A water-absorbent resin production method wherein an acrylic monomer is polymerized by mixing an acrylic monomer solution with inert gas at a stirring Reynolds number of not less than 10000 in the absence of a surface active agent or in the presence of not more than 0.003% by weight of a surface active agent to the acrylic monomer such that fine bubbles of the inert gas are suspended in the acrylic monomer solution.

(2) A water-absorbent resin production method wherein an acrylic monomer is polymerized by mixing an acrylic monomer solution with inert gas by use of a micro bubble generator in the absence of a surface active agent or in the presence of not more than 0.003% by weight of a surface active agent to the acrylic monomer such that bubbles of the inert gas are suspended in the acrylic monomer solution.

(3) A water-absorbent resin production method wherein the polymerization is started with the acrylic monomer solution in which bubbles of inert gas which bubbles have a number average diameter of 10 μm to 500 μm are suspended.

(4) The water-absorbent resin production method described in (1) to (3) wherein the polymerization is such that the acrylic monomer is polymerized by polymerizing, in the absence of a surface active agent, the acrylic monomer solution in which bubbles of inert gas are suspended.

(5) The water-absorbent resin production method described in (1) to (4) wherein the acrylic monomer solution of not less than 500 kg/hr is used.

INDUSTRIAL APPLICABILITY

In a case where water-absorbent resin powder of the present invention is employed at a high concentration for a thin water-absorber such as a disposable diaper, the water-absorbent resin powder of the present invention can provide an absorbency (water-absorbent property) more excellent than that of a conventional absorber.

The invention claimed is:

1. Polyacrylic water-absorbent resin powder having a water-absorbency index of not less than 90 and a bulk specific gravity of 0.6 [g/cm$^3$] to 0.8 [g/cm$^3$] and resulting in, when added and sedimented in a physiological saline, that the physiological saline has a surface tension of not less than 60 [mN/m], the water-absorbency index being calculated by the following formula:

(Water-absorbency index)=(FSR [g/g/sec])×(bulk specific gravity [g/cm$^3$])×(weight average particle diameter [μm])

(where FSR is a water-absorption rate of 1 g of the polyacrylic water-absorbent resin powder for absorbing 20 g of a physiological saline), wherein an SFC (Saline Flow Conductivity) is not less than 50 [×10$^{-7}$·Cm$^3$s·g$^{-1}$].

2. The polyacrylic water-absorbent resin powder of claim 1, wherein said polyacrylic water-absorbent resin powder has a porous surface.

3. The polyacrylic water-absorbent resin powder of claim 2, wherein said porous surface has pores with an average diameter of not more than 100 μm.

4. The polyacrylic water-absorbent resin powder of claim 2, wherein said porous surface has pores with an average diameter of 0.1 μm to 90 μm.

5. The polyacrylic water-absorbent resin powder of claim 2, wherein said porous surface has pores with an average diameter of 1 μm to 50 μm.

* * * * *